(12) United States Patent
Matsukawa et al.

(10) Patent No.: US 8,442,714 B2
(45) Date of Patent: May 14, 2013

(54) AUTONOMOUS MOBILE DEVICE, AND CONTROL DEVICE AND PROGRAM PRODUCT FOR THE AUTONOMOUS MOBILE DEVICE

(75) Inventors: Yoshihiko Matsukawa, Nara (JP); Soichiro Fujioka, Osaka (JP); Yuji Adachi, Osaka (JP); Toshio Inaji, Osaka (JP)

(73) Assignee: Panasonic Corporation, Osaka (JP)

( * ) Notice: Subject to any disclaimer, the term of this patent is extended or adjusted under 35 U.S.C. 154(b) by 1430 days.

(21) Appl. No.: 12/102,635

(22) Filed: Apr. 14, 2008

(65) Prior Publication Data

US 2009/0043440 A1 Feb. 12, 2009

(30) Foreign Application Priority Data

Apr. 12, 2007 (JP) ................................. 2007-104758
Oct. 12, 2007 (JP) ................................. 2007-266340

(51) Int. Cl.
*G05D 1/02* (2006.01)

(52) U.S. Cl.
USPC .................... 701/26; 701/23; 701/25; 701/28; 700/253; 700/255; 700/259; 901/1; 382/153

(58) Field of Classification Search .................... 701/23, 701/25, 26, 27, 300, 301; 700/253, 255, 700/259; 901/1; 382/153
See application file for complete search history.

(56) References Cited

U.S. PATENT DOCUMENTS

| | | | |
|---|---|---|---|
| 6,408,247 B1 * | 6/2002 | Ichikawa et al. | 701/301 |
| 7,095,336 B2 * | 8/2006 | Rodgers et al. | 340/903 |
| 7,130,448 B2 * | 10/2006 | Nagaoka et al. | 382/104 |
| 7,398,136 B2 * | 7/2008 | Higaki et al. | 700/255 |
| 7,447,593 B2 * | 11/2008 | Estkowski et al. | 701/301 |
| 7,571,026 B2 * | 8/2009 | Nakamura et al. | 700/251 |
| 7,710,248 B2 * | 5/2010 | Greene et al. | 340/436 |
| 7,761,231 B2 * | 7/2010 | Kawabe et al. | 701/493 |
| 7,788,027 B2 * | 8/2010 | Jones | 701/519 |
| 7,831,391 B2 * | 11/2010 | Greene et al. | 701/301 |
| 7,881,868 B2 * | 2/2011 | Greene et al. | 701/301 |

(Continued)

FOREIGN PATENT DOCUMENTS

| | | |
|---|---|---|
| JP | 4-358209 | 12/1992 |
| JP | 2003-241836 | 8/2003 |
| JP | 2004-34274 | 2/2004 |
| JP | 2006-35381 | 2/2006 |

OTHER PUBLICATIONS

L. Navarro-Serment, C. Mertz and M. Herbert, "Predictive Mover Detection and Tacking in Cluttered Environments," Robotics Institute, Paper 355, Jan. 2006.*

(Continued)

*Primary Examiner* — Thomas Black
*Assistant Examiner* — Peter D Nolan
(74) *Attorney, Agent, or Firm* — Wenderoth, Lind & Ponack, L.L.P.

(57) ABSTRACT

An autonomous mobile device has its movement controlled by a control device and includes a first sensing unit for sensing an obstacle. The control device includes a first storage unit for storing information as to a temporary positional fluctuation of the obstacle and sets as a virtual obstacle region a region where it is predicted that the obstacle sensed by the first sensing unit travels following a predetermined time passage based on the information as to the temporary positional fluctuation of the obstacle stored in the first storage unit.

4 Claims, 27 Drawing Sheets

U.S. PATENT DOCUMENTS

| | | | | |
|---|---|---|---|---|
| 8,090,537 | B2 * | 1/2012 | Nishira et al. | 701/301 |
| 2006/0041381 | A1 * | 2/2006 | Simon et al. | 701/301 |
| 2006/0282218 | A1 * | 12/2006 | Urai et al. | 701/301 |
| 2007/0027579 | A1 * | 2/2007 | Suzuki et al. | 700/245 |
| 2010/0241289 | A1 * | 9/2010 | Sandberg | 701/2 |

OTHER PUBLICATIONS

Y. Murakami, Y. Kuno, N. Shimada and Y. Shirai, "Collision Avoidance by Observing Pedestrians' Faces for Intelligent Wheelchairs," In Proc. IEEE/RSJ International Conference on Intelligent Robots and Systems, 2001, pp. 2018-2023.*

T. Gandhi and M. Trivedi, "Pedestrian Collision Avoidance Systems: A Survey of Computer Vision Based Recent Studies," In Proc. IEEE Intelligent Transportation Systems Conference, 2006, pp. 976-981.*

Japanese Office Action (along with English translation) issued Sep. 8, 2009 in Japanese Application No. 2008-099548.

Takashi Tsubouchi et al., "Planning and Navigation by a Mobile Robot in the Presence of Multiple Moving Obstacles and their Velocities", Japan Robot Journal, vol. 12, No. 7, pp. 1029-1037, 1994 (Abstract Only).

Takashi Tsubouchi et al., "A Mobile Robot Navigation Scheme for an Environment with Multiple Moving Obstacles", Proceedings of the 1992 IEEE/RSJ International Conference on Intelligent Robots and Systems, Raleigh, NC, Jul. 7-10, 1992.

* cited by examiner

FIG.12

| NODE NUMBER | X CORRDINATE | y | NUMBER OF CONNECTIONS | CONNECTION POINT 1 | CONNECTION POINT 2 | CONNECTION POINT 3 | CONNECTION POINT 4 |
|---|---|---|---|---|---|---|---|
| N101 | 2000 | 8000 | 1 | N102 | 0 | 0 | 0 |
| N102 | 1000 | 8000 | 2 | N101 | N103 | 0 | 0 |
| N103 | 1000 | 6000 | 2 | N102 | N105 | 0 | 0 |
| N104 | 0 | 4300 | 2 | N110 | N105 | 0 | 0 |
| N105 | 1000 | 4300 | 4 | N103 | N104 | N106 | 0 |
| N106 | 2000 | 4300 | 2 | N105 | N111 | 0 | 0 |
| N107 | 1000 | 3000 | 2 | N105 | N108 | 0 | 0 |
| N108 | 1000 | 1000 | 2 | N107 | N112 | 0 | 0 |
| ... | ... | ... | ... | ... | ... | ... | ... |

EVENT INFORMATION FORMAT

{(TIME (tei), PERSON ID (Hi), CONNECTION NODE NUMBER (Ni), COMMENT (Ci))| i=0, ..., Ne-1}

FIG.13B

| EVENT INFORMATION | EVENT DATA |
|---|---|
| EVENT INFORMATION 1 | {(8:00, MR. MATSUSHITA, CONNECTION NODE N101, "OUT FOR OFFICE") (18:30, MR. MATSUSHITA, CONNECTION NODE N108, "RETURN HOME") ....} |
| EVENT INFORMATION 2 | {(8:30, MR. SATO, CONNECTION NODE N101, "OUT FOR OFFICE") (20:30, MR. SATO, CONNECTION NODE N108, "RETURN HOME") ....} |
| EVENT INFORMATION 3 | {(10:00, MR. TANAKA, CONNECTION NODE N101, "OUT FOR OFFICE") (16:30, MR. TANAKA, CONNECTION NODE N108, "RETURN HOME") ....} |

302

AUTONOMOUS MOBILE DEVICE, AND CONTROL DEVICE AND PROGRAM PRODUCT FOR THE AUTONOMOUS MOBILE DEVICE

BACKGROUND OF THE INVENTION

1. Field of the Invention

The present invention relates to an autonomous mobile device having its movement controlled by a control device, and a control device and a program product for the autonomous mobile device.

2. Background Art

Recently, various robots which share an activity space with human beings have been announced. Examples of the robots include autonomous mobile robots for hospital use and domestic use such as cleaning robots for cleaning floors instead of persons and nursing-care robots for transferring a person who hardly can move by himself or a person in bed. In the recent aging society, such robots for reducing burdens of persons and supporting persons come to be material in the society. Since robots which coexist with persons should be safe for persons, such a collision avoidance technique has been presented that collision with a moving person is avoidable (for example, see Non-patent Document 1).

[Non-patent Document] Takashi TSUBOUCHI, Tomohide NANIWA, Suguru ARIMOTO "PLANNING AND NAVIGATION BY A MOBILE ROBOT IN THE PRESENCE OF MULTIPLE MOVING OBSTACLES AND THEIR VELOCITIES" Japan Robot Journal, Vol. 12, No. 7, pp. 1029-1037, 1994

In the conventional collision avoidance technique, a transfer pathway and a transfer velocity were predicted linearly based on a velocity vector of a moving person, and a robot avoids the transfer pathway to avoid a collision with the moving person. However, it was hard to predict a movement of a person, and thus the robot could take an evasive action in a direction the person moved due to an unforeseeable movement of a person. As such, it has been difficult to have the robot take a safe, easy, and smooth evasive action.

SUMMARY OF THE INVENTION

The present invention is directed to provide an autonomous mobile device which can take a safe, easy, and smooth evasive action with regard to the movement of a person.

The present invention is directed to a control device which can control a movement of an autonomous mobile device with a first sensing unit for sensing an obstacle which has its movement controlled, the control device including a first storage unit for storing information as to a temporal positional fluctuation of the obstacle and a region setting unit for setting a virtual obstacle region where it is predicted that the obstacle sensed by the first sensing unit moves following a predetermined time passage based on the information as to the temporal positional fluctuation of the obstacle stored in the first storage unit.

According to the present invention, where the obstacle is a person, the first storage unit stores information as to the temporal positional fluctuation of the person. The region setting unit sets a virtual obstacle region where it is predicted that the person moves following a predetermined time passage based on the information as to the temporal positional fluctuation of the person. The autonomous mobile device can take a safe, easy, and smooth evasive action with regard to the movement of a person since the virtual obstacle region is set.

These and other objects, features, aspects and advantages of the present invention will become more apparent upon a reading of the following detailed description with reference to accompanying drawings.

BRIEF DESCRIPTION OF THE DRAWINGS

FIG. 12 illustrates an example of connection nodes for pathways in the environmental map.

FIG. 13 illustrates another example using event information to the autonomous mobile device of FIG. 1.

DETAILED DESCRIPTION OF THE INVENTION

Now, an autonomous mobile device according to one embodiment of the invention will be described below with reference to the accompanying drawings.

Figure 17:
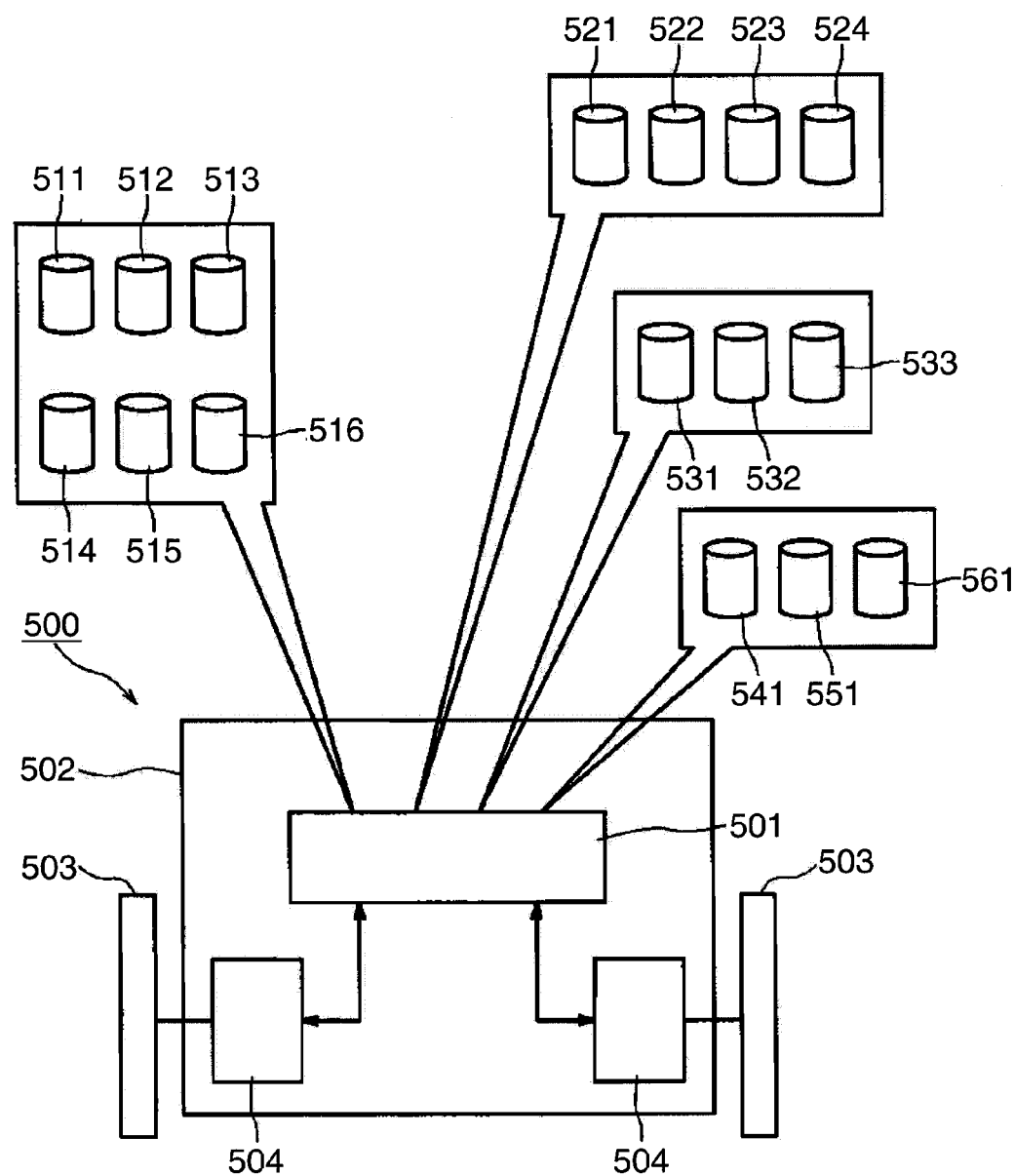
FIG. 17 illustrates an autonomous mobile device according to one embodiment of the invention.

As shown in FIG. 17, an autonomous mobile device 500 has its movement controlled by a control device 501. More specifically, in the present embodiment, the autonomous mobile device 500 includes an apparatus main body 502, wheels 503 mounted to the apparatus main body 502, and an actuator 504 for driving the wheels 503, as shown in FIG. 17, in which the actuator 504 is controlled by the control device 501. The control device 501 includes a storage unit and an operation unit, and controls the actuator 504 according to a preinstalled program and further controls a movement of the autonomous mobile device 500.

Figure 18:
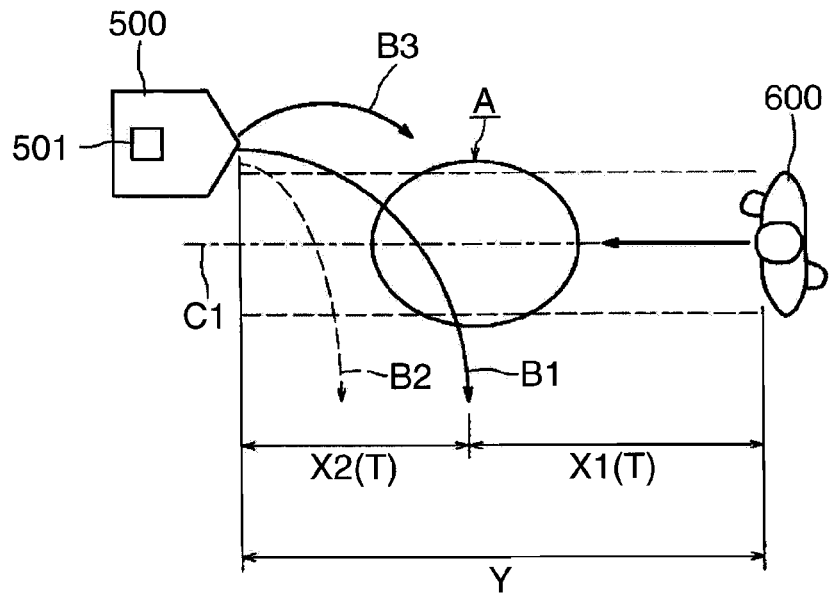
FIG. 18 is a plane view of a virtual obstacle region formed by the autonomous mobile device according to one embodiment of the invention.

In the present embodiment, the autonomous mobile device 500 further includes a first sensing unit 511 for sensing an obstacle. The first sensing unit 511 senses the obstacle including a person 600 or an object which are obstacles when the autonomous mobile device 500 travels, for example, as shown in FIG. 18. Examples of the first sensing unit 511 include a stereo camera, TOF (time of flight) type range image camera, and laser range finder (hereinafter referred to as "LRF").

The control device 501, as shown in FIG. 17, includes a first storage unit 521 and a virtual obstacle region setting unit 531, and the first storage unit 521 stores information as to a temporary positional fluctuation of the obstacle. The virtual obstacle region setting unit 531 sets a virtual obstacle region where it is predicted that the person 600 (obstacle) sensed by the first sensing unit 511 moves following a predetermined time passage based on the information as to the temporary positional fluctuation of the person 600 (obstacle) stored in the first storage unit 521.

For example, FIG. 18 illustrates the situation in which a virtual obstacle region A where it is predicted that the person 600 (obstacle) moves following the predetermined time passage is set. The virtual obstacle region A is set in consideration of the temporary positional fluctuation of the person 600 (obstacle). The autonomous mobile device 500 can take a safe, easy, and smooth evasive action with regard to the movement of the person 600 (obstacle) because such a virtual obstacle region A is set.

Now, each of the processing units of the present embodiment will be described below in detail.

The first storage unit 521 stores a variance of an accelerated velocity, an average accelerated velocity, a maximum accelerated velocity, or the like of the person 600 as the information as to the temporary positional fluctuation of the person 600. If there is an uncertainty (fluctuation) in these pieces of information, it shall be proper to consider that an estimated position of the person where the person reaches after a predetermined time passage is not a point but a certain region from a safety aspect. In order to obtain the certain region, the information as to the temporary positional fluctuation will be used. Here, the information such as the variance of the accelerated velocity, the average accelerated velocity, and the maximum accelerated velocity of the person 600 may be, for example, collected in a preliminary test of the accelerated velocity information of the person and may be stored based on thus collected data. The information indicates a gait characteristic of the person. Alternatively, in addition to the above, the information as to the temporary positional fluctuation of the person 600 can be set by data collected in a preliminary test in which data how a position of the person when he/she moves changes as time passes. In such a case, it is preferable to have the first storage unit 521 store the temporary positional fluctuation of the person which is set based on thus collected data.

The virtual obstacle region setting unit 531 sets the "virtual obstacle region" based on the information as to the temporary positional fluctuation of the person 600 (obstacle) stored in the first storage unit 521. In other words, the virtual obstacle region setting unit 531 sets the virtual obstacle region A where it is predicted that the person 600 (obstacle) sensed by the first sensing unit 511 moves following the predetermined time passage based on the information such as the variance of the accelerated velocity, the average accelerated velocity, and the maximum accelerated velocity of the person 600 (obstacle) stored in the first storage unit 521 as shown in FIG. 18.

Here, the predetermined time means a possible time that the person 600 (obstacle) sensed by the first sensing unit 511 and the autonomous mobile device 500 may collide.

As stated above, in the autonomous mobile device 500, the virtual obstacle region A is set, and a transfer pathway setting unit 532 and a movement control unit 533 provided in the control device 501 set a transfer pathway which avoids the virtual obstacle region A in addition to the obstacle itself sensed by the first sensing unit 511 to thereby carry out a transfer control of the autonomous mobile device 500. The transfer pathway setting unit 532 sets the transfer pathway of the autonomous mobile device 500. The movement control unit 533 has the autonomous mobile device 500 move along the transfer pathway set by the transfer pathway setting unit 532. In the present embodiment, the control device 501 sets a transfer pathway B2 of the autonomous mobile device 500 so as to avoid the virtual obstacle region A set by the above-described virtual obstacle region setting unit 531 as shown in FIG. 18. Also, depending on the virtual obstacle region A set by the virtual obstacle region setting unit 531, a transfer pathway B3 may be set so as to stop the autonomous mobile device 500 at an appropriate position outside the virtual obstacle region A. In the present embodiment, the control device 501 sets an appropriate transfer pathway to avoid the virtual obstacle region A set by the virtual obstacle region setting unit 531 based on a program installed in the transfer pathway setting unit 532.

Now, the possible time in which the obstacle and the autonomous mobile device may collide, and a method for acquiring the virtual obstacle region will be described below. The possible collision time will be used in order to acquire a position of the virtual obstacle region.

Initially, before acquiring the possible collision time, a second sensing unit 512 and a third sensing unit 513 provided in the control device 501 will be described with reference to FIG. 17.

The second sensing unit 512 senses a position of the person 600 (obstacle). In the present embodiment, the second sensing unit 512 senses the position of the person 600 (obstacle) based on the information output from the first sensing unit 511 which senses the person 600 (obstacle). For example, it is preferable for the second sensing unit 512 to specify a position of the person 600 (obstacle) based on the information obtainable through a stereo camera, a TOF (time of flight) type range image camera, a laser range finder (hereinafter referred to as the "LRF"), and the like A third sensing unit 513 senses a velocity of the person 600 (obstacle). In the present embodiment, the third sensing unit 513 senses a speed of the person 600 (obstacle) based on the position of the person 600 (obstacle) sensed by the second sensing unit 512. In other words, in the present embodiment, the third sensing unit 513 acquires the speed of the person 600 (obstacle) while the person 600 (obstacle) is moving such that an amount of change (distance) of the positions of the sensed person 600 (obstacle) is divided by a lapsed time. If the autonomous mobile device 500 includes a velocity sensor for sensing the speed of the person 600 (obstacle), the third sensing unit 513 may sense the speed of the person 600 (obstacle) based on the information sensed by the velocity sensor. An absolute velocity of the person 600 is used here; however, the velocity may be acquired such that a relative velocity of the person 600 (obstacle) with regard to the autonomous mobile device 500 is detected to calculate the velocity based on the relative velocity, or the absolute velocity may be directly detected.

Then, as shown in FIG. 18, assuming that the person 600 (obstacle) moves at a constant velocity, i.e., at the velocity sensed by the third sensing unit 513 based on the position of the person 600 (obstacle) sensed by the second sensing unit 512, and the autonomous mobile device 500 moves along the transfer pathway B1 set by the transfer pathway setting unit 532, the control device 501 predicts a possible time T at which the person 600 (obstacle) and the autonomous mobile device 500 may collide.

Now, a method of acquiring the possible time T at which the person 600 (obstacle) and the autonomous mobile device 500 may collide will be described below in detail.

Figure 19:
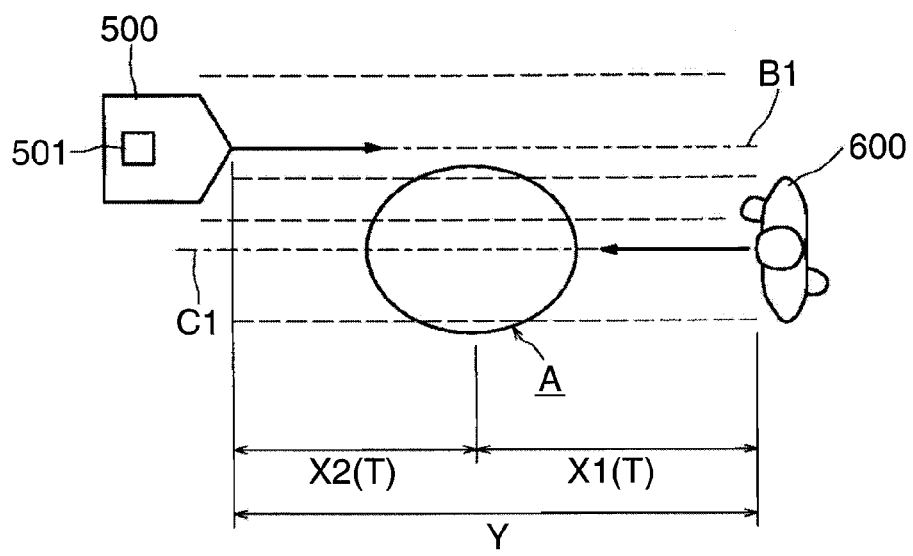
FIG. 19 is a plane view of a virtual obstacle region formed by the autonomous mobile device according to one embodiment of the invention.

In the present embodiment, assuming that the person 600 (obstacle) moves at a constant velocity and the autonomous mobile device 500 moves along the transfer pathway B1 set by the transfer pathway setting unit 532 as shown in FIGS. 18 and 19, the control device 501 predicts the possible time at which the person 600 (obstacle) and the autonomous mobile device 500 may collide.

Now, three embodiments will be described below as to the method of predicting the possible time (possible collision time) at which the person 600 (obstacle) and the autonomous mobile device 500 may collide.

(Possible Collision Time: Uniform Linear Motion)

In the first embodiment, the control device 501 includes the second sensing unit 512 for sensing the position of the person 600 (obstacle) and the third sensing unit 513 for sensing the speed of the person 600 (obstacle). As shown in FIGS. 18 and 19, the control device 501 calculates a distance Y between the person 600 (obstacle) and the autonomous mobile device 500 in a direction parallel to a velocity vector of the person 600 (obstacle); a distance X1 (T) of the person 600 (obstacle) after T time passes when the person 600 (obstacle) moves with a uniform linear motion at the speed sensed by the third sensing unit 513; and a distance X2 (T) of the autonomous mobile device 500 after t time passes in a direction parallel to the velocity vector of the person 600 (obstacle) when the autonomous mobile device 500 moves along the transfer pathway B1 set by the transfer pathway setting unit 532. As such, the control device 501 predicts the possible time T at which the person 600 (obstacle) and the autonomous mobile device 500 may collide based on the following formula 1.

$$X1(T) - X2(T) = Y \qquad \text{[Formula 1]}$$

In this case, the distance X2 (T) of the autonomous mobile device 500 after t time passes in the direction parallel to the velocity vector of the person 600 (obstacle) can be calculated by the following formula 2.

$$X2(T) = \int_0^T v_{rx}(t)\,dt \qquad \text{[Formula 2]}$$

In the formula 2, $V_{rx}(t)$ means a speed of the autonomous mobile device 500 in the direction of the velocity vector of the person 600 (obstacle) after t second(s) passes. Also, t=0 is defined as the current time.

In this case, the distance Y can be calculated based on the position of the person 600 (obstacle) sensed by the second sensing unit 512, the speed of the person 600 (obstacle) sensed by the third sensing unit 513, the position of the autonomous mobile device 500, and the speed of the autonomous mobile device 500. Also, the distance X1 (T) of the person 600 (obstacle) after T time passes can be calculated based on the speed of the person 600 (obstacle) sensed by the third sensing unit 513. The distance X2 (T) of the autonomous mobile device 500 after T time passes can be calculated based on the transfer pathway set by the transfer pathway setting unit 532. The control device 501 may calculate the above-described distance Y, the distance X1 (T) of the person 600 (obstacle) after T time passes, and the distance X2 (T) of the autonomous mobile device 500 after T time passes, and further may calculate the time T of X1(T)−X2(T)=Y. As such, the control device 501 can predict an appropriate time as the possible time T at which the person 600 (obstacle) and the autonomous mobile device 500 may collide with a relatively simple operation.

Now, a second modification will be described below as to a method of predicting the possible time at which the person 600 (obstacle) and the autonomous mobile device 500 may collide.

(Possible Collision Time: Uniform Accelerated Motion)

The control device 501 includes, as shown in FIG. 17, the second sensing unit 512 for sensing the position of the person 600 (obstacle); the third sensing unit 513 for sensing the velocity of the person 600 (obstacle); and a fourth sensing unit 514 for sensing an accelerated velocity of the person 600 (obstacle). In the present modification, the control device 501 calculates the above-described distance Y and the distance X2 (T) of the autonomous mobile device 500 after T time passes. Also, as to the distance X1 (T) of the person 600 (obstacle) after T time passes, the distance X1 (T) of the person 600 (obstacle) after t time passes where the person 600 (obstacle) moves with a uniform accelerated linear motion at the speed sensed by the third sensing unit 513 and at the accelerated velocity sensed by the fourth sensing unit 514 is calculated. Then, the control device 501 predicts the possible time T at which the person 600 (obstacle) and the autonomous mobile device 500 may collide based on the above-described formula 1.

In this case, it is assumed that the person 600 (obstacle) moves with the uniform accelerated linear motion. The distance X2 (T) of the autonomous mobile device 500 after T time passes will be calculated relatively with ease. Therefore, the control device can predict the appropriate time as the possible time T at which the person 600 (obstacle) and the autonomous mobile device 500 may collide with a relatively simple operation.

In the above-described embodiments, the control device predicts the possible time T at which the person 600 (obstacle) and the autonomous mobile device 500 may collide by calculating the distance Y between the person 600 (obstacle) and the autonomous mobile device 500 in the direction of the velocity vector of the person 600 (obstacle), the distance X1(T) of the person 600 (obstacle) after T time passes in the above direction, and the distance X2 (T) of the autonomous mobile device 500 after T time passes.

Now, the third modification will be described as to a method of predicting the possible time at which the obstacle and the autonomous mobile device may collide.

(Possible Collision Time: Minimum Distance)

Figure 20:
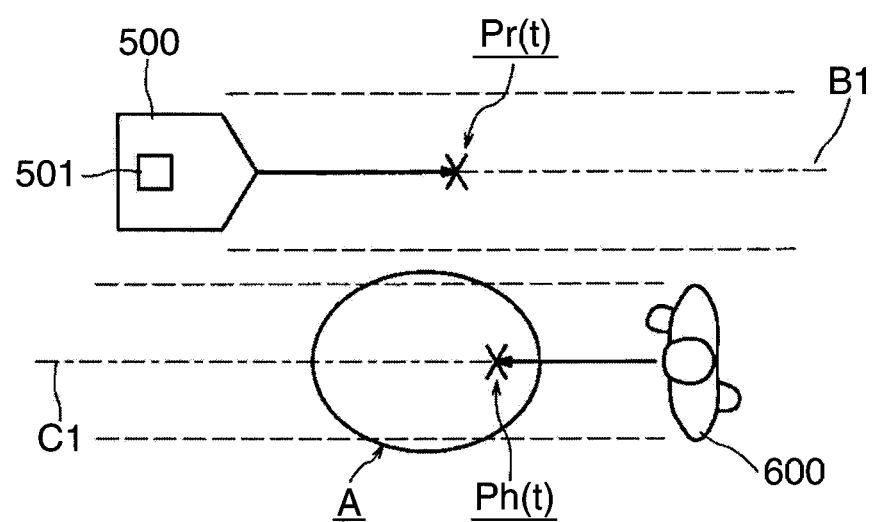
FIG. 20 is a plane view of a virtual obstacle region formed by the autonomous mobile device according to one embodiment of the invention.

The control device 501 includes the second sensing unit 512 for sensing the position of the person 600 (obstacle) and the third sensing unit 513 for sensing the speed of the person 600 (obstacle) as shown in FIG. 20. In the present modification, the control device 501 calculates a position Ph (t) of the person 600 (obstacle) after t time passes when the person 600 (obstacle) moves with the uniform linear motion at the speed sensed by the third sensing unit 513 and a position Pr (t) of the autonomous mobile device 500 after t time passes when the autonomous mobile device 500 moves along the transfer pathway set by the transfer pathway setting unit 532. Then, the control device predicts the time T at which the distance between the person 600 (obstacle) and the autonomous mobile device 500 becomes a minimum as the possible time at which the person 600 (obstacle) and the autonomous mobile device 500 may collide based on the following formula 3.

$$T = \arg\min_t |Ph(t) - Pr(t)|,$$  [Formula 3]

PROVIDED THAT, IF THERE ARE
PLURALITY OF (t)S, THE MINIMUM
VALUE WILL BE EMPLOYED

In this case, as shown in FIG. 20, there is such a case that a transfer pathway B1 of the autonomous mobile device 500 will not overlap a transfer pathway C1 of the person 600 (obstacle) when the person 600 (obstacle) moves with the uniform linear motion. According to the present method, the time T at which the distance between the person 600 (obstacle) and the autonomous mobile device 500 becomes the minimum is predicted as the possible time at which the person 600 (obstacle) and the autonomous mobile device 500 may collide. Accordingly, the control device 501, as shown in FIG. 20, can set the virtual obstacle region A. Also, according to the method, when the transfer pathway B1 of the autonomous mobile device 500 overlaps the transfer pathway C1 of the person 600 (obstacle) as shown in FIGS. 18 and 19, the time T at which the distance between the person 600 (obstacle) and the autonomous mobile device 500 becomes the minimum can be predicted as the possible time at which the person 600 (obstacle) and the autonomous mobile device 500 may collide. Accordingly, the control device 501 can set the virtual obstacle region A.

In formula 3, if there are a plurality of values t, the minimum value (the nearest possible time at which the person 600 (obstacle) and the autonomous mobile device 500 may collide) may be predicted as the possible time at which the person 600 (obstacle) and the autonomous mobile device 500 may collide.

As described above, the possible time T at which the person 600 (obstacle) and the autonomous mobile device 500 may collide may be calculated by acquiring a position Ph(t) of a position of the person 600 (obstacle) after t time passes and a position Pr(t) of the autonomous mobile device 500 after t time passes. In this case, the control device can predict an appropriate time as the possible time T at which the person 600 (obstacle) and the autonomous mobile device 500 may collide with a relatively simple operation. Also, in the above-described modification, when the control device calculates the position Pr(t) of the person 600 (obstacle) after t time passes, such a situation may be assumed that the person 600 (obstacle) moves with the uniform linear motion; however, such a situation may also be assumed that the person 600 (obstacle) moves with the uniform accelerated linear motion.

In the present embodiment, the autonomous mobile device 500 predicts the possible time T at which the person 600 (obstacle) and the autonomous mobile device 500 may collide among the above-described methods of predicting the possible time T at which the person 600 (obstacle) and the autonomous mobile device 500 may collide based on a method having been decided by a program. Various methods of predicting the possible time T at which the person 600 (obstacle) and the autonomous mobile device 500 may collide have been exemplified above; however, the method of predicting the time T at which the person 600 (obstacle) and the autonomous mobile device 500 may collide is not limited to the above ones. Another method of predicting the possible time T at which the person 600 (obstacle) and the autonomous mobile device 500 may collide may be employed.

Now, various methods of setting the virtual obstacle region will be described below.

In the present embodiment, the control device 500 includes a first setting unit 541 for setting a variance of the accelerated velocity of the person 600 (obstacle). The variance of the accelerated velocity of the person 600 is exemplified as one piece of information as to the temporary positional fluctuation of the person 600. The virtual obstacle region A is set based on the predicted time at which the person 600 (obstacle) and the autonomous mobile device 500 may collide and the variance of the accelerated velocity of the person 600 (obstacle) set by the first setting unit 541.

Figure 23:
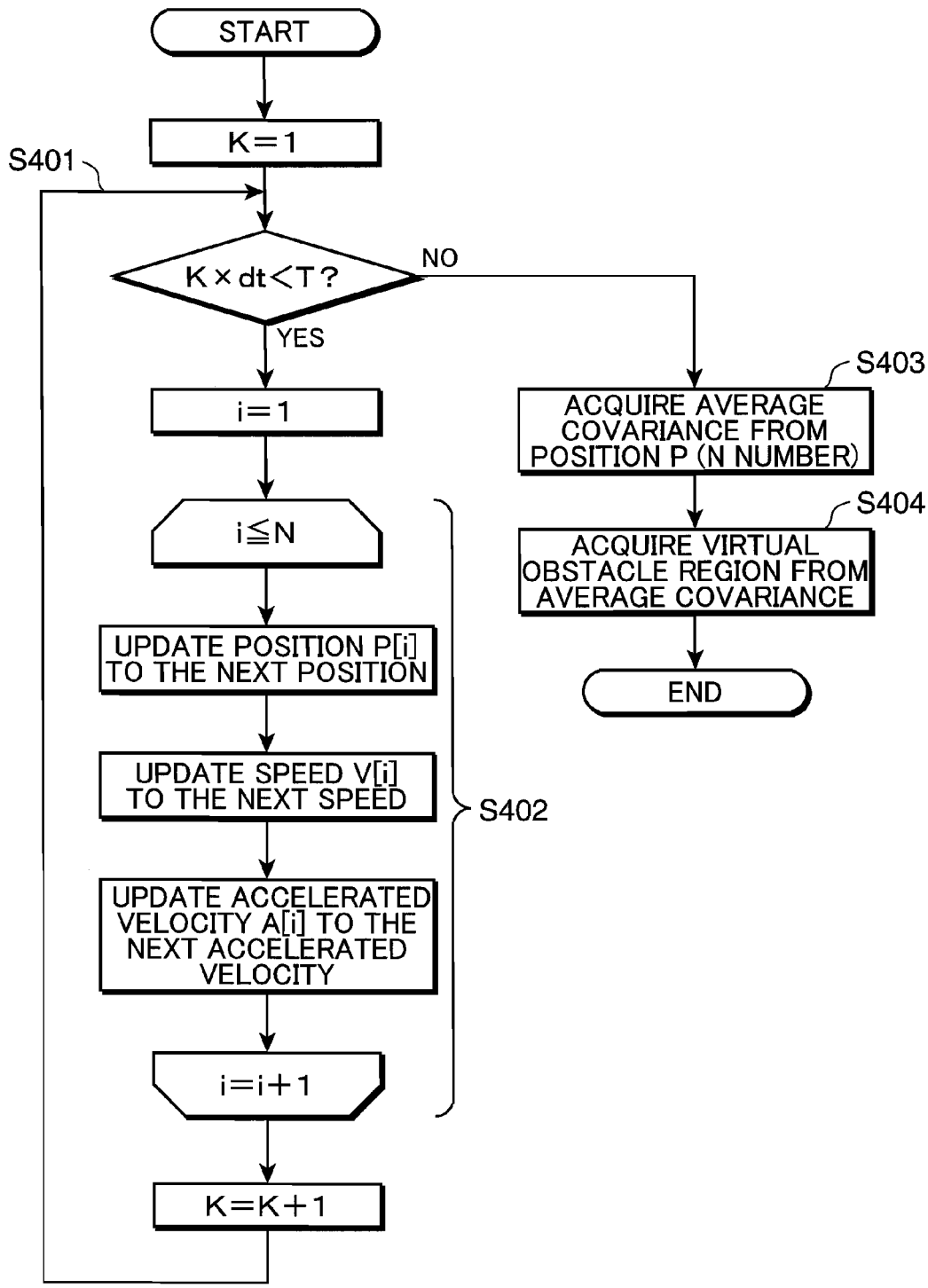
FIG. 23 is a flow chart illustrating a process of setting a virtual obstacle region in the autonomous mobile device according to one embodiment of the invention.

In the present embodiment, the first setting unit 541 sets an average and the variance of the positions of the person 600 (obstacle) based on the possible time T at which the person 600 (obstacle) and the autonomous mobile device 500 may collide following the flow chart of FIG. 23.

The present embodiment is directed to a method of simulating where a person is when the possible time T at which the person 600 (obstacle) and the autonomous mobile device 500 may collide has passed, assuming that the person moves while he/she has a fluctuation in the accelerated velocity. The method is carried out such that a number of particles N of the person is preliminary set and thereby a position of each particle is calculated for each sampling cycle dt. The particle is a possible position where the person may be at each time (or a center position of the region). The sampling cycle dt is preliminary set to, for example, 100 ms. Also, the number of particles N of the person 600 (obstacle) is preliminary set. Then, assuming that there is a fluctuation in accelerated velocity in each particle when the person moves, the position of each particle when the possible time T at which the person 600 (obstacle) and the autonomous mobile device 500 may collide has passed is simulated. As a result of the simulation, the virtual obstacle region A where it is predicted that the person 600 (obstacle) moves to is set when the possible time T at which the person 600 (obstacle) and the autonomous mobile device 500 may collide has passed.

In the present embodiment, a state variable of each of the position, the speed, and the accelerated velocity of the person

600 (obstacle) are set. Here, the position, the speed, and the accelerated velocity of the person 600 (obstacle) are denoted by a P[i] (position), a V[i] (velocity), and a A[i] (accelerated velocity) which are state variable, respectively, where i indicates one particle of the person 600 (obstacle) which takes values between 1 to N.

As shown in FIG. 23, the possible time T at which the person 600 (obstacle) and the autonomous mobile device 500 may collide will be divided by the sampling cycle dt to simulate the position of each particle for every sampling cycle dt until the value becomes from K=1 to K×dt<T while incrementing the value of K one by one in step S401. Calculation of the position of each particle is carried out by the following formula 4 updating the P[i] (position), V[i] (velocity), and A[i] (accelerated velocity) in step S402. At this time, the simulation of the position of each particle is carried out by updating the value i from i=1 to i=N.

$$P[i]=P[i]+V[i]\times dt$$

$$V[i]=V[i]+A[i]\times dt$$

$$A[i]=A[i]+(\sigma_{ax}\text{rand}_x+\mu_{ax}, \sigma_{ay}\text{rand}_y+\mu_{ay}) \quad \text{[Formula 4]}$$

Here, $\sigma_{ax}$ denotes the variance of the accelerated velocity of the traveling direction of the person 600 (obstacle), and $\sigma_{ay}$ denotes the variance of the accelerated velocity in a direction orthogonal to the traveling direction of the person 600 (obstacle). Also, each of $\text{rand}_x$ and $\text{rand}_y$ denotes a normal random number (average 0, variance 1). Also, $v_{ax}$ denotes an average accelerated velocity in the traveling direction of the person 600 (obstacle), and $\mu_{ay}$ denotes an average accelerated velocity in a direction orthogonal to the traveling direction of the person 600 (obstacle). Each of the $\sigma_{ax}$, the $\sigma_{ay}$, the $\mu_{ax}$, and the $\mu_{ay}$ is information as to the predetermined positional fluctuation of the obstacle.

In the present embodiment, the position of each particle is simulated for each sampling cycle dt from K=1 to K×dt<T while changing the value K in step S401. Accordingly, positions P of the N number of particles at the time when the possible time at which the person 600 (obstacle) and the autonomous mobile device 500 may collide passes will be decided. Subsequently, an average position Pa of positions P of the N number of particles will be acquired. The average position Pa can be acquired based on the average position $\text{Pa}_x$ in the traveling direction of the person 600 (obstacle) and the average position $\text{Pa}_y$ in the direction orthogonal to the traveling direction of the person 600 (obstacle). Also, a covariance Σ can be defined by the following formula 5 in step S403.

$$Pa = (pa_x, pa_y) \quad \text{[Formula 5]}$$

$$\sum = \begin{pmatrix} \sigma_x^2 & \sigma_{xy} \\ \sigma_{xy} & \sigma_y^2 \end{pmatrix}$$

Here, $\sigma_x^2$ denotes the variance of the x component of the position, $\sigma_{xy}$ denotes the covariance between the x component and the y component of the position, and $\sigma_y^2$ denotes the variance of the y component of the position, respectively.

In the present embodiment, an ellipse having a center at the average position Pa of the positions P of the N number of samples will be acquired in step S404. The ellipse may be acquired from the covariance having been acquired above based on the following formula 6.

$$(P-Pa)\Sigma^{-1}(P-Pa)'=D^2 \quad \text{[Formula 6]}$$

Here, D is defined as a preliminary set value. If D=1, it is so predicted that the person 600 (obstacle) would be within the ellipse with about a probability of 63%. In order to predict the virtual obstacle region more safely, the value D is set to a larger value. Also, the virtual obstacle region is not limited to the ellipse but may be a rectangular shape, for example, a rectangle may be formed so as to circumscribe the ellipse.

Now, another method of setting the virtual obstacle region will be described below.

Figure 21:
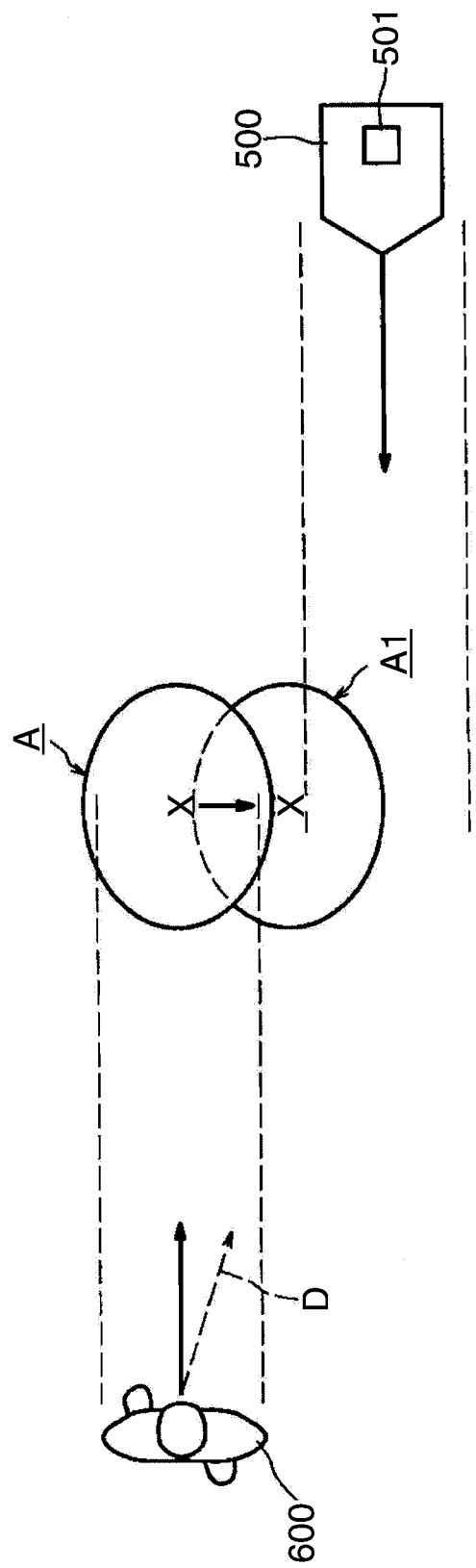
FIG. 21 is a plane view of a virtual obstacle region formed by the autonomous mobile device according to one embodiment of the invention.

According to the another method, the control device 501 stores a relation between the lapsed time and a degree of the positional fluctuation of the person 600 (obstacle) with regard to a direction of the velocity vector of the person 600 (obstacle) and a direction orthogonal to the velocity vector. Then, the virtual obstacle region A is set as a region which is defined based on the relation between the lapsed time and the degree of the positional fluctuation of the person 600 (obstacle) as shown in FIG. 21. The degree of the positional fluctuation of the person 600 (obstacle) can be represented by a function of the lapsed time t. In this case, the virtual obstacle region A can be formed into a region extending in the direction of the velocity vector of the person 600 (obstacle) and the direction orthogonal to the velocity vector, for example, can be formed into the ellipse shape of FIG. 21 and the rectangular shape of which illustration is omitted here.

Various methods are exemplified with regard to the method of setting the virtual obstacle region A; however, the method of setting the virtual obstacle region A is limited to the above-described ones. Further, another method of setting the virtual obstacle region A may be employed.

Figure 24:
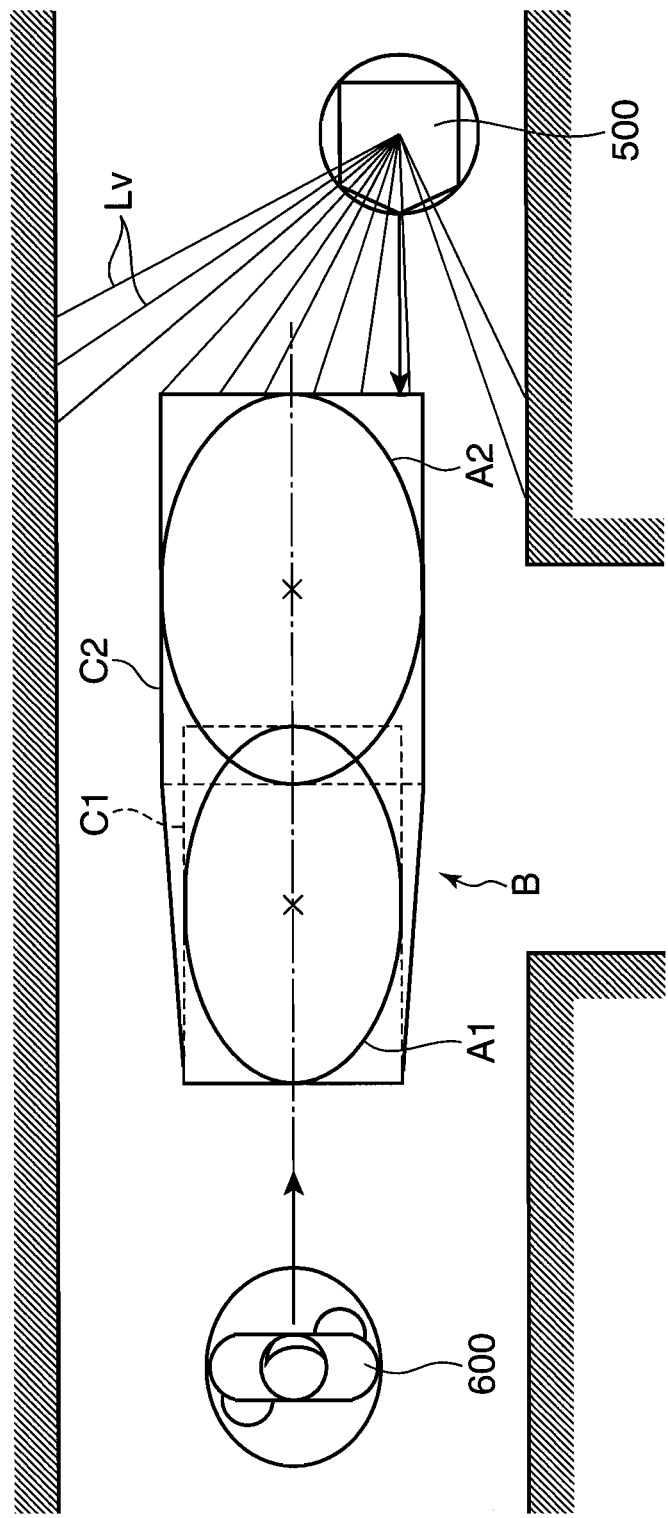
FIG. 24 illustrates a process of setting a new virtual obstacle region encompassing two virtual obstacle regions.
Figure 25:
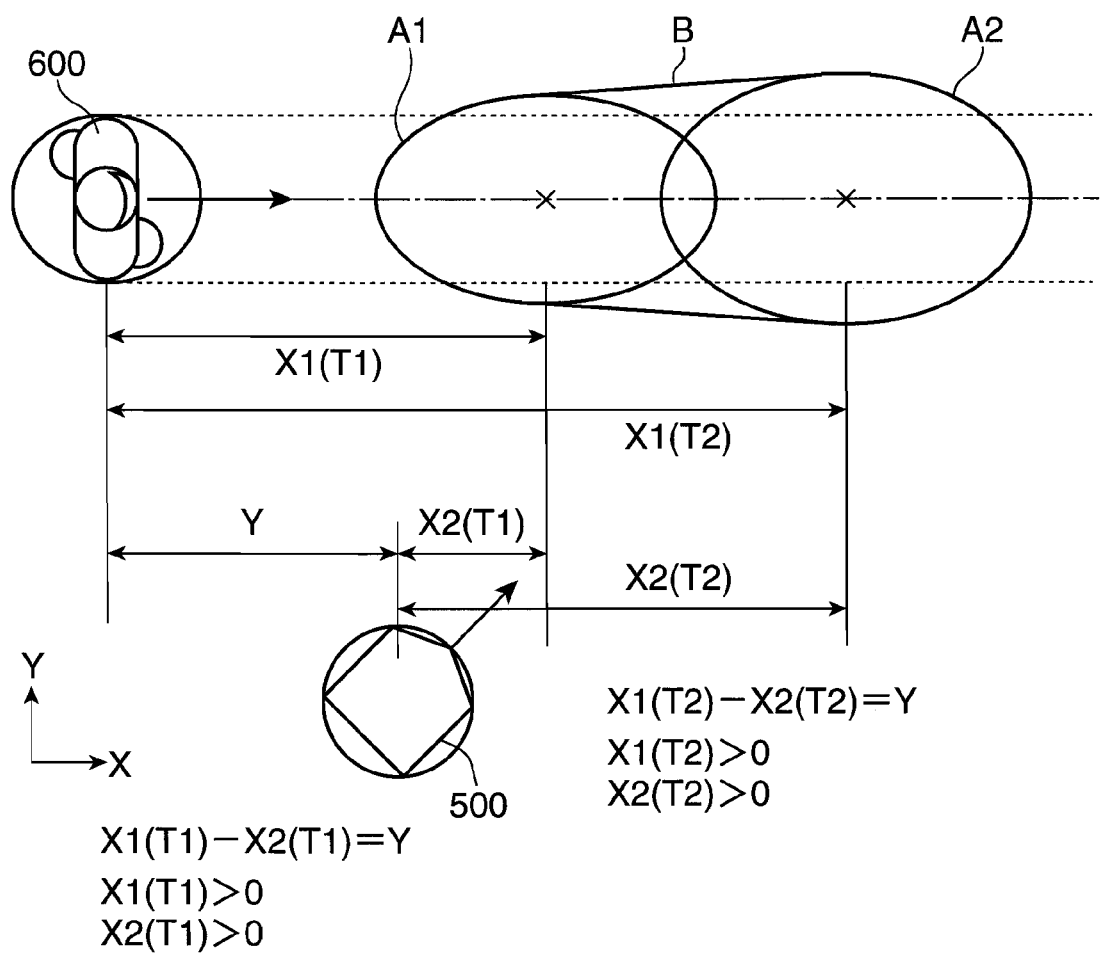
FIG. 25 illustrates a process of acquiring a collision prediction time.

For example, the virtual obstacle region assuming that the person 600 moves with the uniform motion and the virtual obstacle region assuming that the person 600 moves with the uniform accelerated motion may be operated to set a region encompassing both regions as a new virtual obstacle region. More specifically, as shown in FIG. 24, a collision prediction time T1 is acquired assuming that the person 600 moves with the uniform motion, as well as the virtual obstacle region A1 at the time T1 thereof is calculated. Also, the collision prediction time T2 is acquired assuming that the person 600 moves with the uniform accelerated motion, as well as the virtual obstacle region A2 at the time T2 thereof is calculated. Then, when the virtual obstacle regions A1, A2 are formed into an ellipse shape, the circumscribing regions C1, C2 which are of a rectangular shape and circumscribing each of the virtual obstacle regions are set to combine those circumscribing regions C1, C2 to form one virtual obstacle region B encompassing the two virtual obstacle regions A1, A2. In order to combine the two circumscribing regions C1, C2 into one region, for example, the corners of the circumscribing region C2 having a larger width and the corners of the circumscribing region C1 having a smaller width are coupled by lines to each other to form the closed region B of a trapezoid shape. In order to set the virtual obstacle region B, the circumscribing regions C1, C2 should not always be used. For example, as shown in FIG. 25, the closed region B can be formed by setting common tangents of the two virtual obstacle regions A1, A2.

FIG. 24 illustrates that the thus derived two virtual obstacle regions A1, A2 partially overlap with each other; however, there may be such a case that the two virtual obstacle regions A1, A2 are placed away from each other. In such a case, two corners among the corners of the circumscribing region C1 which are nearer to the circumscribing region C2 and two corners among the corners of the circumscribing region C2 which are nearer to the circumscribing region C1 are coupled to each other to form one closed virtual obstacle region B.

Accordingly, setting of the transfer pathway of the autonomous mobile device 500 can be avoided from being set within the region between the two spaced virtual obstacle regions A1, A2.

Now, a method of acquiring a prediction time until the person 600 and the autonomous mobile device 500 collide will be described below. In order to calculate the prediction time, as shown in FIG. 25, the distance in a direction the person 600 travels is used as the distance between the person 600 and the autonomous mobile device 500. That is, a distance between a center of the person 600 in the direction the person 600 travels (X axis direction in FIG. 25) and a center of the autonomous mobile device 500 will be a distance Y. If the collision prediction time assuming that the person 600 moves with the uniform linear motion is T1, if a distance the person 600 travels before the time T1 passes is a distance X1(T1), and if a distance the autonomous mobile device 500 travels is X2 (T2), the prediction time T1 at which the collision occurs can be calculated by calculating the time T1 of X1(T1)−X2(T1)=Y. Also, if the collision prediction time assuming that the person 600 moves with the uniform accelerated linear motion is T2, the prediction time T2 at which the collision occurs can be calculated by calculating the time T2 of X1(T2)−X2(T2)=Y.

Figure 26:
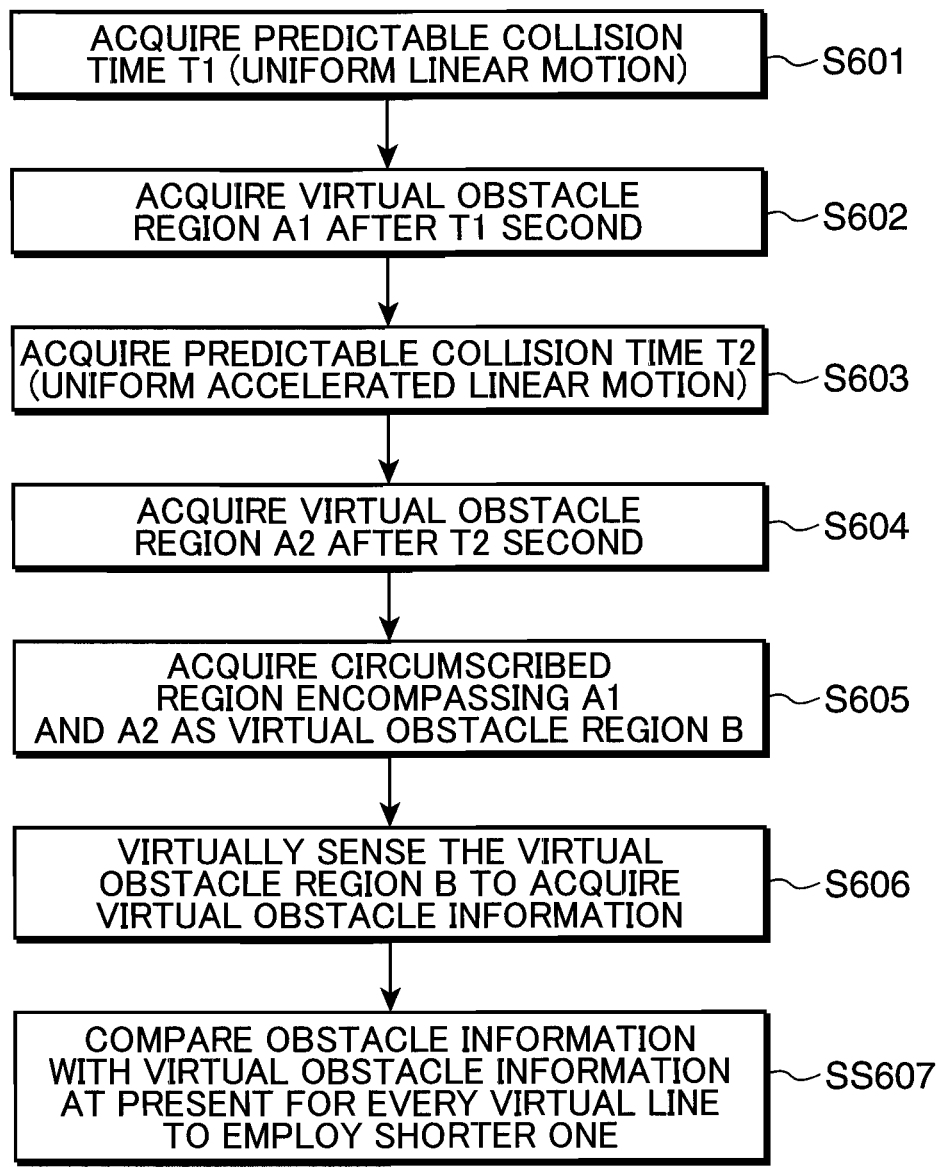
FIG. 26 is a flow chart illustrating a flow from acquiring the collision prediction time to setting sensor points.

Now, a process of setting the virtual obstacle region will be described below with reference to FIG. 26. Assuming that the person 600 continues the uniform linear motion, the time T1 at which the collision occurs between the person 600 and the autonomous mobile device 500 is calculated in step S601. Thereafter, the virtual obstacle region A1 after the time T1 passes is calculated in step S602. Also, assuming that the person 600 moves with the uniform accelerated linear motion, the time T2 at which the collision occurs between the person 600 and the autonomous mobile device 500 is calculated in step S603. Then, the virtual obstacle region A2 after the time T2 passes is calculated in step S604. The accelerated velocity of the person 600 upon calculating the virtual obstacle region A2 is used within the maximum accelerated velocity stored in the first storage unit 521 and, for example, the accelerated velocity acquired in the fourth sensing unit 514 is used as a center value of the accelerated velocity. Subsequently, a closed region encompassing the virtual obstacle region A1 and the virtual obstacle region A2 is acquired as a new virtual obstacle region B in step S605. Then, a virtual sensing is carried out for the virtual obstacle region B to acquire the virtual obstacle information in step S606. In other words, imaginary lines Lv extending radially and equally spaced from the first sensing unit 511 are set to obtain positions of crossing points between the imaginary lines Lv and the virtual obstacle region B as the virtual obstacle information. The information as to the actual obstacle such as a wall and the virtual obstacle information are compared to each other to determine which one of the actual obstacle region and the virtual obstacle region B is nearer to the autonomous mobile device 500 for each of the imaginary lines Lv. As such, the obstacle region having a shorter distance from the autonomous mobile device 500 is employed as the obstacle region to be avoided in step S607.

In the present embodiment, the control device 501 includes a first determination unit 551 and a fifth sensing unit 515 as shown in FIG. 17. The first determination unit 551 determines whether or not the obstacle 600 sensed by the first sensing unit 511 is a person. The fifth sensing unit 515 senses a face orientation or a direction of eyes of a person. In the present embodiment, the control unit 501 expands the virtual obstacle region A in a manner illustrated by A1 of FIG. 21 in a direction D of the face orientation or the direction of eyes based on the direction D of the face orientation or the direction of eyes of a person sensed by the fifth sensing unit 515 as illustrated in FIG. 21 when the first determination unit 551 determines that the obstacle 600 sensed by the fifth sensing unit 515 is a person. The fifth sensing unit 515 which senses the face orientation or the direction of eyes of a person can employ various methods of assuming the face orientation and the direction of eyes of a person from, for example, an image shot by an imaging device.

As described above, the face orientation or the direction of eyes of a person tends to orient in a direction the person pays his attention while he is walking. And, the person tends to move in this direction. Therefore, as shown in FIG. 21, the virtual obstacle region A where it is predicted that the person 600 moves to after the predicted time has passed can be more appropriately set by expanding the virtual obstacle region A in a direction of the face orientation or the direction of eyes of the person 600 based on the face orientation or the direction of eyes of the person 600. Accordingly, the virtual obstacle region A appropriate to have the autonomous mobile device 500 take a smooth evasive action can be set. It can be optionally set how much the virtual obstacle region A is expanded in the direction of the face orientation or the direction of eyes of the person 600. For example, a degree of expansion of the virtual obstacle region A may be decided such that a preliminary test is performed to obtain data to be stored, and the virtual obstacle region A will be determined based on the stored data.

Instead of the above-described embodiment, the control device 501 may shift the virtual obstacle region A in a direction of the face orientation or the direction of eyes of a person based on the face orientation or the direction of eyes of a person sensed by the fifth sensing unit 515 when the first determination unit 551 determines that the obstacle 600 is a person. Accordingly, the virtual obstacle region A suitable to have the autonomous mobile device 500 take the smooth evasive action can be set. In this case, it can be optionally set how much the virtual obstacle region A is shifted in the direction of the face orientation or the direction of eyes of the person. For example, a preliminary test is performed to have the resulting data stored, and thereby the degree of shifting the virtual obstacle region A may be decided based on the thus stored data.

Figure 27:
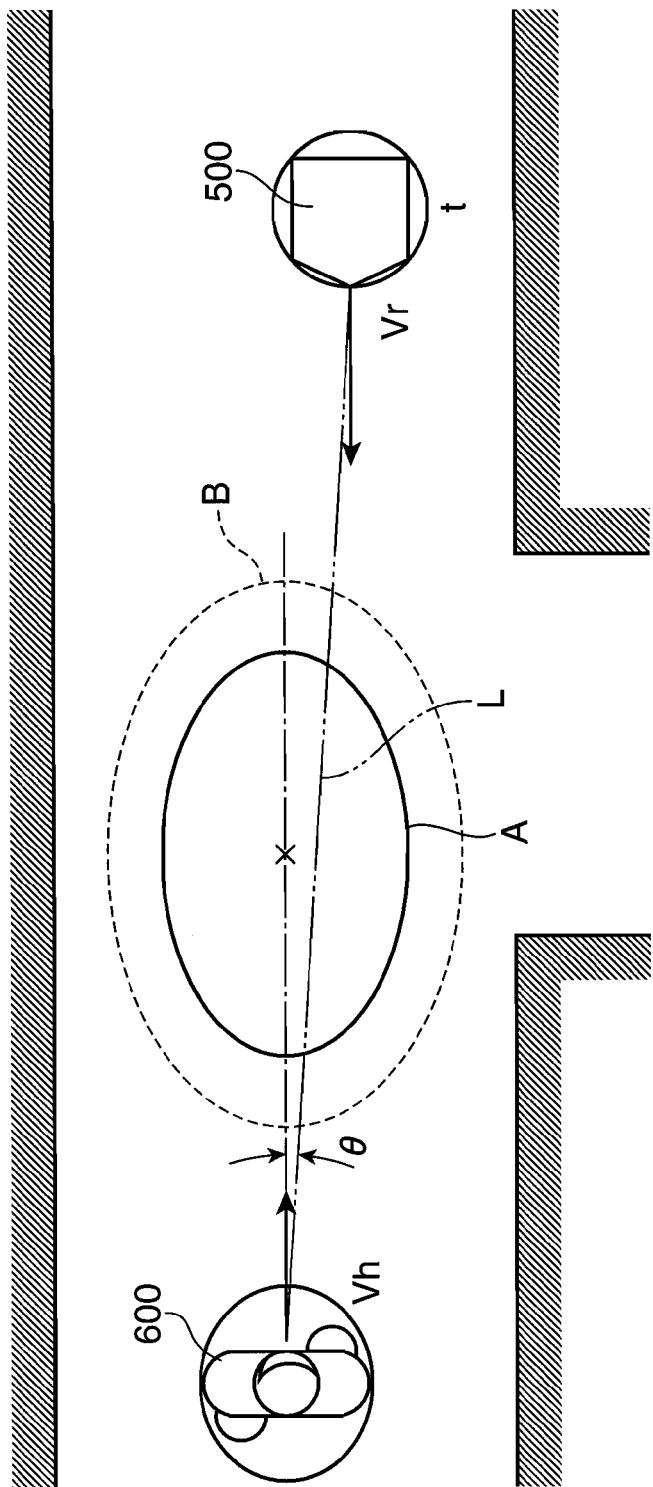
FIG. 27 illustrates a process of enlarging the virtual obstacle region.

As to how much the virtual obstacle region A is expanded, it can be set, for example, based on a straight line L coupling the person 600 with the autonomous mobile device 500 as show in FIG. 27. More specifically, provided that an angle between the direction of the face orientation or the direction of eyes of the person and the line L coupling the eyes of the person with the fifth sensing unit 515 of the autonomous mobile device 500 is θ, the variance of the accelerated velocity of the person 600 may be compensated using the following formula 7. Accordingly, the virtual obstacle region A can be expanded to the region B in accordance with the direction of eyes of the person. Also, if the variance value of the accelerated velocity is not compensated but the center position of the ellipse is shifted, the virtual obstacle region A can be shifted in accordance with the direction of eyes. When the face orientation or the direction of eyes of the person 600 deviates with regard to a direction of the autonomous mobile device 500, the person 600 tends not to find the autonomous mobile device 500. However, if the virtual obstacle region A is expanded or shifted in accordance with a deviating amount from the line L, it becomes possible for the autonomous mobile device 500 to take the smooth evasive action.

$$\sigma_{ax}[i]=\sigma_{ax}[i](1+Cx\times|\sin\theta|)$$

$$\sigma_{ay}[i]=\sigma_{ay}[i](1+Cy\times|\sin\theta|) \qquad \text{[Formula 7]}$$

PROVIDED THAT Cx AND Cy ARE CONSTANT NUMBERS.

The autonomous mobile device can consider not only the horizontal movement of the sight lines and the face orientation but also the vertical movement thereof, such that the virtual obstacle region A may be expanded at its place upon sensing that the sight line or the face orientation of a person is oriented lower (higher) than a line coupling the person and the robot (the autonomous mobile device).

Also, for example, a movement of a child is hard to assume in comparison with that of an adult and the temporary fluctuation of the movement of a child is larger than that of an adult. When the obstacle is a person, the control device may determine whether the obstacle is an adult or a child and may shift the virtual obstacle region A in accordance with the adult and the child.

In the present embodiment, the control device 501 includes a sixth sensing unit 516 for sensing a height of a person as shown in FIG. 17. The height of the person sensed by the sixth sensing unit 516 contributes to expand the virtual obstacle region A if the height of the person is lower than the predetermined height. That is, in the present embodiment, if the sensed person is an adult or a child is determined based on the height. According to a method of determining if the sensed person is an adult or a child based on his/her height, it is expected that the determination between an adult and up to a 10-year old child who moves quickly and thus whose movement is hard to predict can be done precisely to a certain degree. And therefore, it is possible to set the virtual obstacle region A in accordance with the movement of the child if the obstacle is a child. As such, even if the obstacle is a child, it is possible for the autonomous mobile device 500 to take the smooth evasive action.

In the present embodiment, the control device 501 includes a map information storage unit 522 and a moving tendency storage unit 523 as shown in FIG. 17. The map information storage unit 522 stores map information as to a movement region of the autonomous mobile device 500. The moving tendency storage unit 523 stores a relation between a time and a moving tendency of a person in association with the map information stored in the map information storage unit 522. Then, the moving tendency storage unit 523 corrects the virtual obstacle region A based on the moving tendency of the person corresponding to the time stored in the moving tendency storage unit 523.

Figure 22:
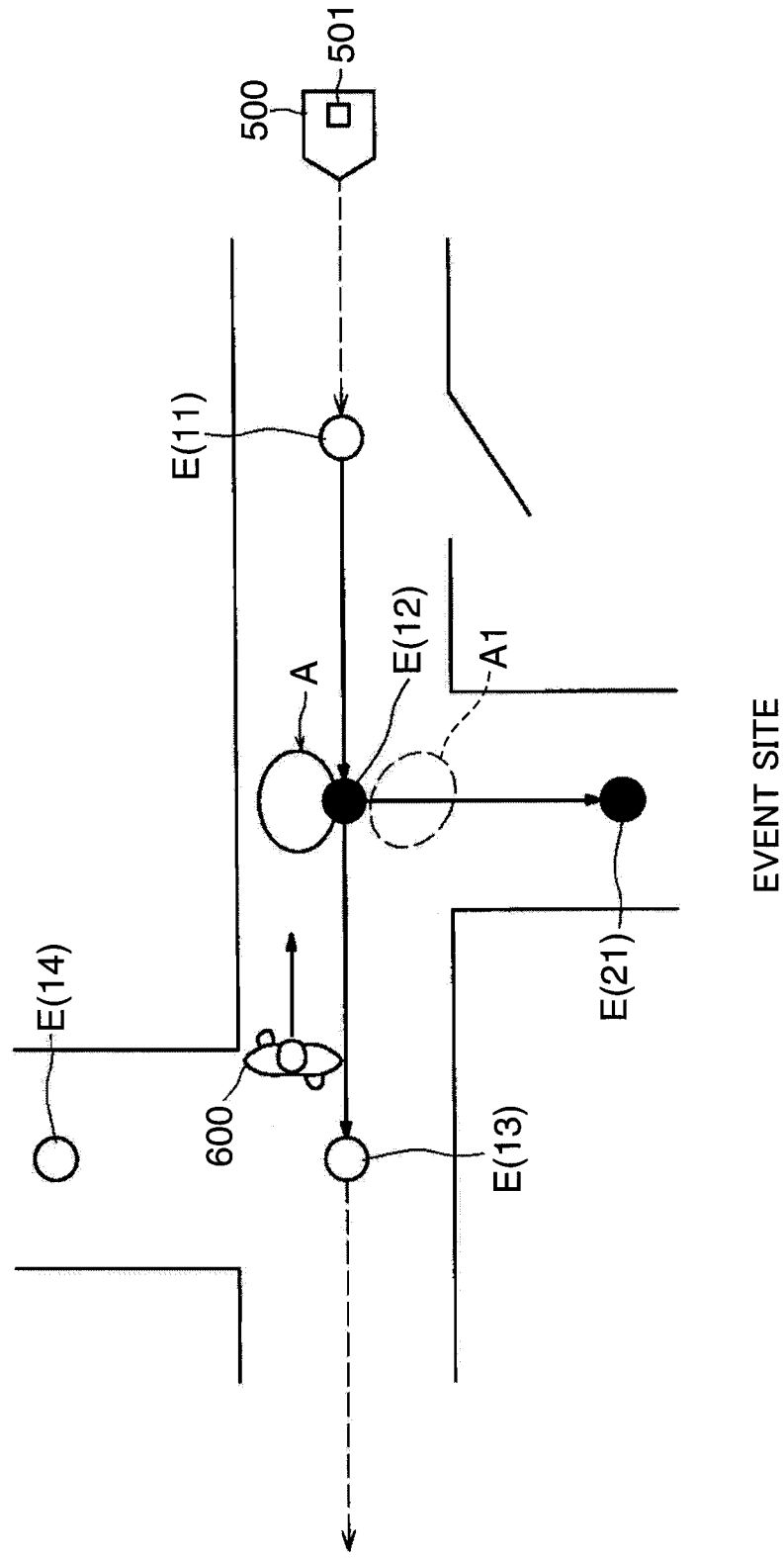
FIG. 22 is a plane view of a virtual obstacle region formed by the autonomous mobile device according to one embodiment of the invention.

In the present embodiment, the map information contains nodes E(n) of which positions within the moving region of the autonomous mobile device 500 are discretely set as shown in FIG. 22. In this case, the moving tendency storage unit 523 may store the relation between the time and the moving tendency of the person 600 in association with each node E. For example, each node E is provided with the corresponding identification number such as E(1) . . . , E(i−1), E(i), E(i+1), . . . . Then, each of the nodes E(n) stores the time and the moving tendency of the person 600 corresponding to the time.

For example, at the event site such as a movie theater, as the curtain time comes close, a stream of persons toward a doorway of the theater tends to be formed, whereas, at the last curtain time, a stream of persons coming out of the doorway tends to be formed. In the present embodiment, the moving tendency storage unit 523 stores a relation between the time and the moving tendency of a person in association with the map information stored in the map information storage unit 522. Then, the virtual obstacle region A is corrected based on the moving tendency of the person corresponding to the time stored in the moving tendency storage unit 523. Accordingly, more suitable virtual obstacle region can be set in order to control the movement of the autonomous mobile device 500 which works at an event site such as a movie theater.

More specifically, for example, in such a case where an event opens at 18:00 and thus there is a tendency that a person moves toward the event site, the map information storage unit 522 may store information as to {node number (node E (12))/time (17:30-18:00), the moving tendency of person (node E (21)), and remarks (event curtain time)} in the node E (12) of the pathway toward the event site as shown in FIG. 22. As described above, the map information is set by the discretely set node, which contributes to easy computer processing.

In the present embodiment, as shown in FIG. 22, the virtual obstacle region A, which is set near the node E (12), is shifted (or expanded) to a side of the node E (21) in a manner illustrated by A1 of FIG. 22 around the time (17:30-18:00). Accordingly, a more suitable virtual obstacle region can be set in order to control the movement of the autonomous mobile device 500 so as not to prevent a person from moving toward the event site.

Also, in the present embodiment, the control device 501 includes a first specifying unit 561 and an ID information storage unit 524 as shown in FIG. 17.

The first specifying unit 561 specifies a person. The first specifying unit 561 can use, for example, various identification techniques. For example, the first specifying unit may use a face authentication device which authenticates a face of the person 600, an iris verification device which verifies an iris of the person 600, or the like.

The ID information storage unit 524 stores the ID information containing information as to the moving tendency of the person who is specified by the first specifying unit 561. The control device 501 corrects the virtual obstacle region A based on the information as to the moving tendency of the person stored in the ID information storage unit 524 when the first determination unit 551 determines that the obstacle is a person and the first specifying unit 561 specifies the person.

For example, almost predetermined residents of an apartment or workers in an office will tend to be obstacles at a high possibility within the apartment and the office building. Further, since the resident's room and the worker's office are also specified, there is such a case that the movement of the person can be predicted more precisely. In the present embodiment, the control device 501 as described above can correct the virtual obstacle region A based on the information as to the moving tendency of the person stored in the ID information storage unit 524 when the first determination unit 551 determines that the obstacle is a person and the first specifying unit 561 specifies the person. Accordingly, a more suitable virtual obstacle region A can be set in order to control the movement of the autonomous mobile device 500 which works in the apartment or the office building.

Also, in the present embodiment, the control device 501 includes a map information storage unit 522 and the ID information storage unit 524 stores a relation between the time and the moving tendency of a person in association with the map information stored in the map information storage unit 522 with regard to the person specified by the first specifying unit 561. Then, the control device 501 corrects the virtual obstacle region A based on the moving tendency of the person corresponding to the time stored in the ID information storage unit 524.

For example, there is such a case that schedules of the workers are preliminary known in an office building or the like. In such case, the autonomous mobile device 500 can predict the behavior of a person by obtaining the schedules of the workers. In the present embodiment, as described above, the control device 501 stores the relation between the time and the moving tendency of a person in association of the map information stored in the map information storage unit 522 with regard to the person specified by the first specifying unit 561. The control device can correct the virtual obstacle region A based on the information as to the moving tendency of the person stored in the ID information storage unit 524 when the first determination unit 551 determines that the obstacle is a person and the first specifying unit 561 specifies the person. Accordingly, the virtual obstacle region can be set in accordance with the schedules of the workers in the office building or the like, and a more suitable virtual obstacle region can be set in order to control the movement of the autonomous mobile device 500 which works in the office building or the like.

The autonomous mobile device according to one embodiment of the invention was described above; however, the autonomous mobile device of the present invention is not limited to the above-described embodiment but may include various modifications.

For example, the obstacle to be sensed is assumed to be a person in the above embodiment, which, however, can be anything other than a person.

Also, the control device for the autonomous mobile device for controlling the movement of the autonomous mobile device may include, for example, a transfer pathway setting unit for setting a transfer pathway of the autonomous mobile device and a movement control unit for having the autonomous mobile device move along the transfer pathway set by the transfer pathway setting unit. In this case, it is preferable for the control device to additionally include a virtual obstacle region setting unit for setting the virtual obstacle region where it is predicted that the sensed obstacle would move to following a predetermined time passage based on the information as to the temporary positional fluctuation of the preliminary stored obstacle. When the virtual obstacle region setting unit is added to the control device, the control device may be so configured that it sets the transfer pathway avoiding the virtual obstacle region set by the virtual obstacle region setting unit.

Further, the virtual obstacle region setting unit may be so configured that it is added or updated by means of an additional program. For example, the virtual obstacle region setting unit may expand the virtual obstacle region in a direction of the face orientation or the direction of eyes of the person, or may further include a function to shift the virtual obstacle region based on the face orientation or the direction of eyes of the person sensed by the above-described fifth sensing unit. When the height of the person sensed by the above-described sixth sensing unit is lower than the predetermined height, a function to expand the virtual obstacle region may be added to the virtual obstacle region setting unit. A function to correct the virtual obstacle region based on the moving tendency of the person corresponding to the time stored in the above-described moving tendency storage unit may be further added to the virtual obstacle region setting unit. Also, a function to correct the virtual obstacle region based on the information as to the moving tendency of the person stored in the above-described ID information storage unit may further be added to the virtual obstacle region setting unit. Accordingly, the autonomous mobile device can change the virtual obstacle region setting unit to be incorporated into the control device 501, or can be provided with required functions with ease. Accordingly, the movement control of the autonomous mobile device can be changed with ease to enable a function change in accordance with a use of the autonomous mobile device with ease.

With regard to a control program to be used in the autonomous mobile device of which movement is controlled by the control device, it may be so configured to have the control device execute the first function for setting the virtual obstacle region where it is predicted that the sensed obstacle would move to following a predetermined time passage based on the information as to the temporary positional fluctuation of the obstacle preliminary stored in the control device. In this case, the control program to be used in the autonomous mobile device may further have the control device execute the second function for setting the transfer pathway of the autonomous mobile device so as to have the autonomous mobile device avoid the virtual obstacle region set by the first function.

With regard to the program to be used in the autonomous mobile device of which movement is controlled by the control device, it may be so configured to include a basic program have the control device execute a transfer pathway setting function for setting a transfer pathway of the autonomous mobile device, and a movement control function for controlling the autonomous mobile device to move along the transfer pathway set by the transfer pathway setting function. In this case, it is preferable for the basic program to be configured such that it can adds a sub-program having a function to set the virtual obstacle region where it is predicted that the sensed obstacle moves to following a predetermined time passage. If the sub-program is added to the basic program, the program used in the autonomous mobile device may have the control device execute the transfer pathway setting function so as to set the transfer pathway avoiding the virtual obstacle region set by the sub-program. In this case, the sub-program may have the control device execute the transfer pathway setting function based on the information as to the temporary positional fluctuation of the obstacle preliminary stored in the control device. The sub-program may be so configured that it is added or updated by an additional program.

The autonomous mobile device, the control device for the autonomous mobile device, and the program for the autonomous mobile device according to one embodiment of the invention have been described above. Another autonomous mobile device will be described below with reference to the accompanying drawings. Each configuration of the control device of the another autonomous mobile device can be incorporated into each configuration of the control device of the above-described autonomous mobile device 500, as required.

Figure 1:
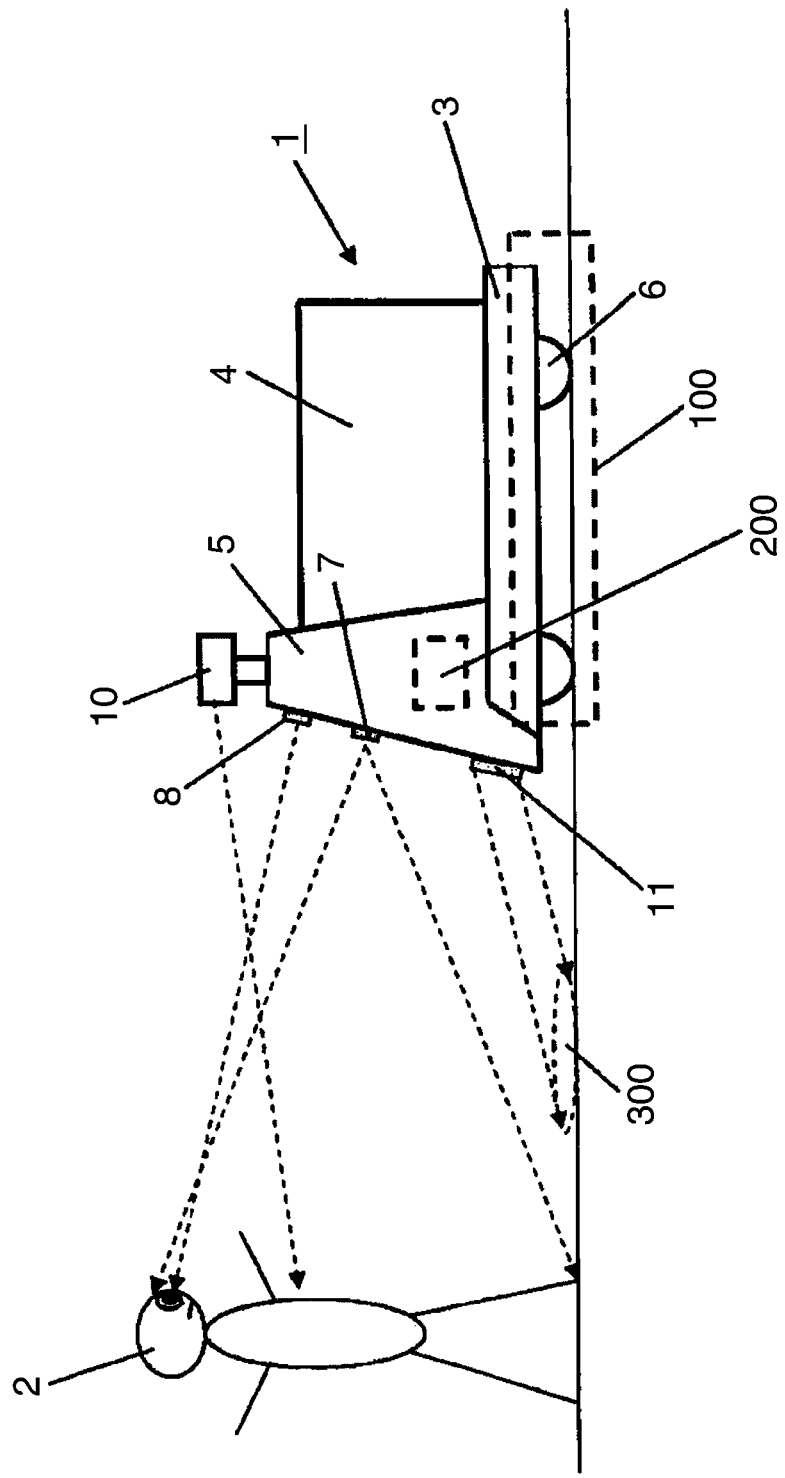
FIG. 1 is a side surface view of an autonomous mobile device according to an embodiment of the invention.

The autonomous mobile device 1 includes a platform 3, a placement unit 4, a driving unit 5, a position transportation unit 100, and a collision avoidance control device 200 (control device) as shown in FIG. 1.

The platform 3 is provided with a transportation device and thus can move a position of the autonomous mobile device 1 by driving, for example, the wheels 6 or the like. The platform 3 is also provided thereon with the placement unit 4 which includes an action unit (not shown) according to purposes of usage such as nursing care, cleaning, conveyance, guidance, and patrol.

Also, the driving unit 5 includes, in addition to a mechanism and an engine to drive the autonomous mobile device 1, a person identification unit 7 for identifying a person 2, a sight line detection unit 8 for sensing a line of sight of the person 2, an obstacle detection unit 10 as the first sensing unit for detecting a moving object (obstacle) such as the person 2 and a stable object around the autonomous mobile device, an alarm unit 11 which informs the person 2 of a safety zone 300 in an identifiable manner, and a collision avoidance control device 200 for controlling the movement of the autonomous mobile device to avoid a collision with the person 2.

A known identification technique can be employed for the person identification unit 7. For example, a face authentication device for authenticating the face of the person 2 and an iris verification device for verifying the iris of the person 2 can be employed. With such devices, the person 2 can be identified.

A sight line detection unit 8 comprises an imaging device or the like and detects a line of sight and a face orientation of the person 2. A known VTR method or the like which presumes the line of sight from an image taken by the imaging device is used as the method of detecting the line of sight.

An obstacle detection unit 10 includes a moving object sensing unit 12 for sensing a moving object such as the person 2 or the like and a stationary object detection unit 13 for detecting a stationary object around the ambient environment. The moving object sensing unit 12 employs such sensor that can measure a spatial shape such as a stereo camera, a TOF (time of flight) type range image camera, and a laser range finder (hereinafter referred to as the "LRF"). The method of detecting the obstacle with the LRF will be described later.

The alarm unit 11 informs the person 2 of the safety area 300 in an identifiable manner. For example, it informs the person 2 of the safety area 300 by lighting the safety area 300 with a light or the like. More specifically, it may inform the person 2 of the safety area 300 by indicating the safety area 300 using a laser light or the like.

Now, a basic function and an operation of the autonomous mobile device 1 will be described below. The autonomous mobile device 1 carries out at least one operation of a stop, a deceleration, an acceleration, and a change of direction such that the autonomous mobile device 1 can avoid a collision with the person 2 as a moving object or the stationary obstacle in accordance with a driving control of the collision avoidance control device 200.

The autonomous mobile device 1 acquires the information as to the person 2 as the moving object in accordance with the operation control of the collision avoidance control device 200 to prepare operation control information necessary for avoiding the collision by using the relating information preliminary held by the collision avoidance control device 200 when the obstacle detection unit 10 detects the person 2 who is in front of the autonomous mobile device 1. The autonomous mobile device 1 selects a necessary transfer pathway based on the operation control information and adjusts a transfer speed and a transfer direction to carry out an operation of avoiding the collision with the obstacle. At the same time, the alarm unit 11 visually warns the person 2 and informs the person 2 of the safety area 300, which is safe for the person 2.

Now, configurations and functions of the position transportation unit 100 and the collision avoidance control device 200 in the autonomous mobile device 1 will be described below with reference to FIG. 2.

Figure 2:
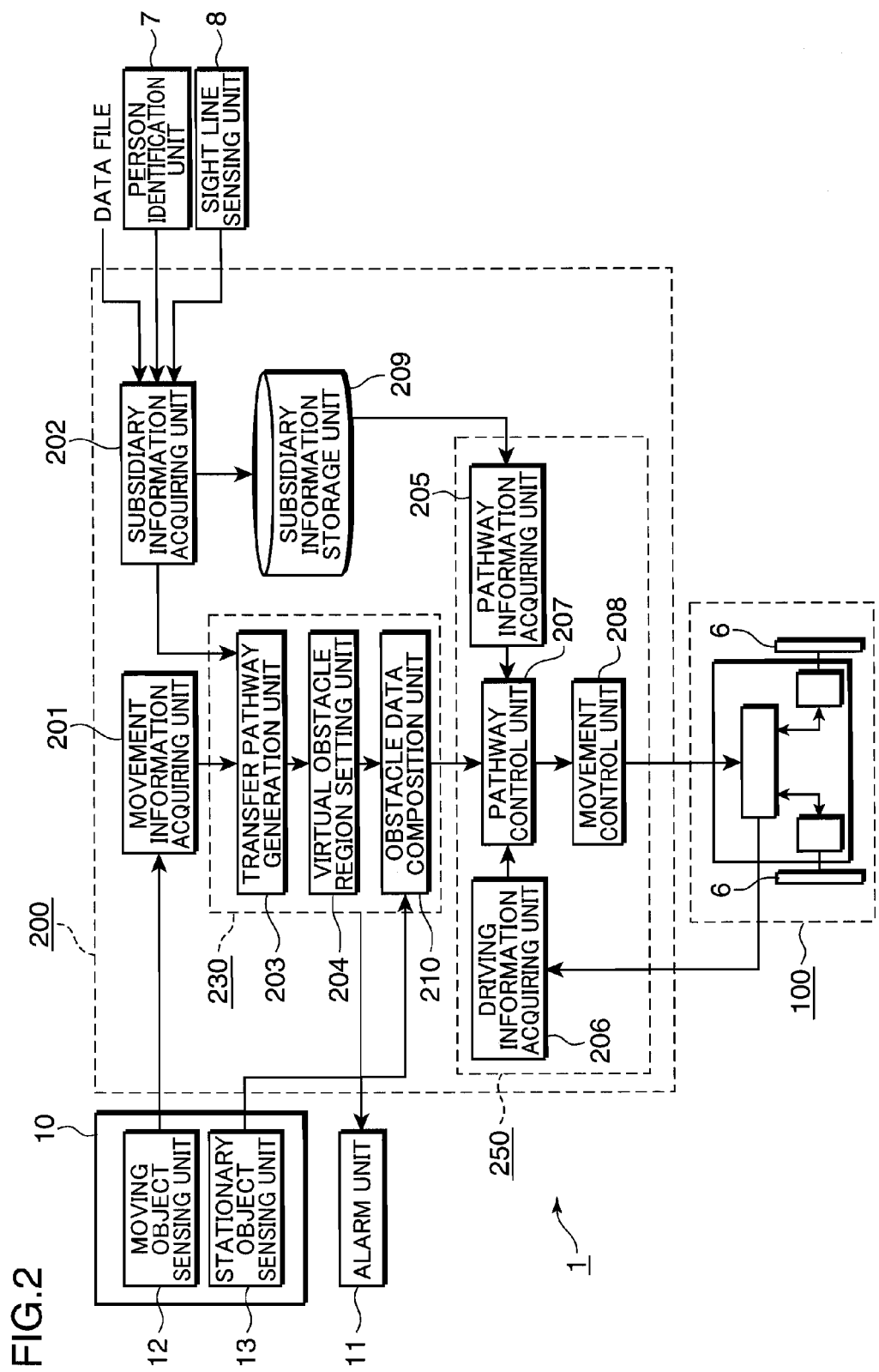
FIG. 2 is a block diagram illustrating a configuration of a collision avoidance control device of the autonomous mobile device of FIG. 1.

FIG. 2 is a block diagram illustrating a configuration of the autonomous mobile device 1. As shown in FIG. 2, the collision avoidance control device 200 includes a transfer information acquiring unit 201 for acquiring the transfer information representing the movement of the person 2 from the obstacle detection unit 10; a subsidiary information acquiring unit 202 as a means for acquiring the subsidiary information representing factors relating to the movement of the person 2; a subsidiary information storage unit 209 for storing the subsidiary information; a potential transfer pathway generation unit 203 for generating potential transfer pathways of the moving object based on the transfer information and the subsidiary information; a virtual obstacle region setting unit 204 for setting the virtual obstacle region where it is predicted that the person 2 would move to following a predetermined time passage based on the information as to the temporary positional fluctuation of the person 2; an obstacle data composition unit 210 which combines the obstacle region (actual obstacle region) of the stationary object detected by the obstacle detection unit 10 and the virtual obstacle region of the person 2 to thereby generate a new virtual obstacle region; and an obstacle avoidance control unit 250 for generating the operation control information for avoiding the collision with the person 2 based on the new virtual obstacle region.

The transfer information acquiring unit 201 acquires the transfer information representing actual conditions of the movement of the moving object, such as a position, a velocity vector, an accelerated velocity vector of the moving object, having been detected by the obstacle detection unit 10.

The subsidiary information acquiring unit 202 acquires subsidiary information representing factors relating to the movement of the moving object. The subsidiary information is additional information representing factors which possibly give an affect to the moving direction, the moving speed, or the like with regard to the movement of the moving object. Examples of the subsidiary information include environment information such as a map; attribute information of the moving object (individual information such as behavior, line of sight, face orientation, height, interest, appearance, history, or the like in the case of a person); and event information representing factors relating to an event (show, festival, or the like). The subsidiary information also includes information as to the maximum speed of a person when he is walking. The subsidiary information acquiring unit 202 may be updated by downloading the environmental information, the attribute information of the moving object, the event information, or the like from the exterior information storage site in the form of a data file as required. The environmental information, the attribute information of the moving object, the event information or the like may be updated with regard to the autonomous mobile device 1 from an exterior device.

Figure 6:
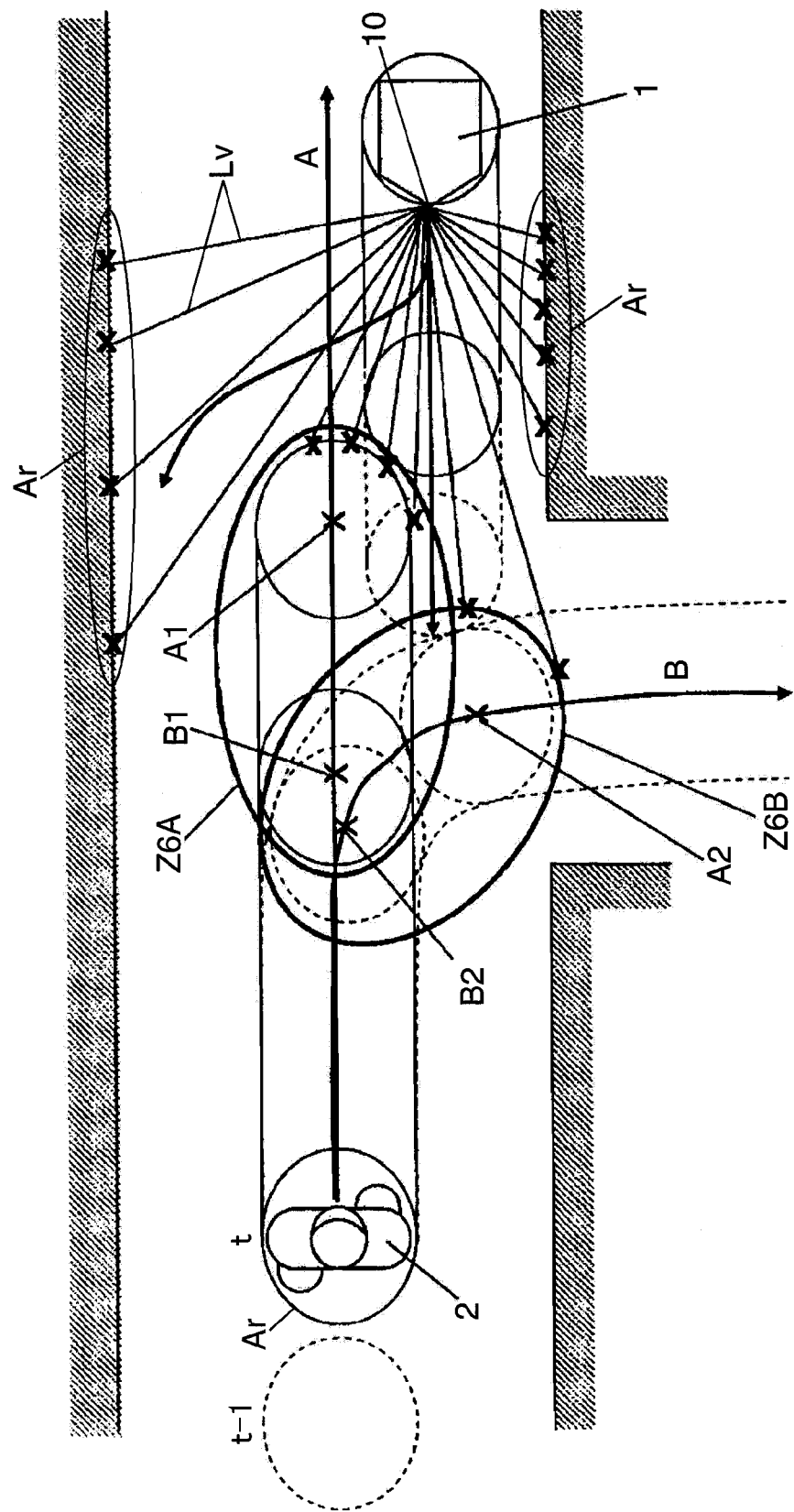
FIG. 6 illustrates a method of simulating a plurality of sensor points on a boundary of the virtual obstacle region in the autonomous mobile device of FIG. 1.

The virtual obstacle setting unit 230 includes a potential transfer pathway generation unit 203, a virtual obstacle region setting unit 204, and an obstacle data composition unit 210, and sets the virtual obstacle region on the pathways where the person 2 may move to with a high possibility based on the transfer information and the subsidiary information relating to the person 2 in addition to the moving vector of the person 2. The obstacle data composition unit 210 combines the obstacle region (actual obstacle region) of the stationary object sensed by the obstacle detection unit 10 and the virtual obstacle region of the person 2 to generate a new obstacle region. There is such a case that the obstacle detection unit 10 senses both of the stationary object and the moving object as the obstacles. In this case, the obstacle data composition unit 210 may combine the information of both of the obstacles to form one obstacle information. More specifically, when the person 2 (moving object) is sensed as illustrated in FIG. 6, the virtual obstacle setting unit sets a region currently occupied by the person 2 and a region occupied by the stationary object such as walls as an actual obstacle region Ar, in addition to virtual obstacle regions Z6A, Z6B calculated as the transfer direction of the person 2 after the predetermined time passes. Then, the obstacle regions Z6A, Z6B, Ar are stored as new obstacle regions. Accordingly, a new obstacle region can be set in consideration of the obstacle region of the stationary object and the virtual obstacle region of the person 2 as the moving object.

The potential transfer pathway generation unit 203 generates one or a plurality of potential transfer pathways where the person 2 may travel when he moves, and the virtual obstacle region setting unit 204 sets the virtual obstacle regions of the person 2 where the person 2 would move following presumed time passage with regard to each of the thus generated potential transfer pathways to prepare the movement control information for avoiding the collision with the person 2. The virtual obstacle setting unit 230 transmits the thus prepared movement control information to the obstacle avoidance control unit 250.

The obstacle avoidance control unit 250 as the obstacle avoidance control device includes a transfer pathway information acquiring unit 205, a driving information acquiring unit 206, a transfer pathway control unit 207 and a movement control unit 208, and carries out an operation to avoid the collision between the autonomous mobile device 1 and the person 2 and the stationary obstacle based on the operation control information received from the virtual obstacle setting unit 230.

The transfer pathway information acquiring unit 205 acquires the information as to the transfer pathway of the autonomous mobile device 1 such as a time and a position thereof, for example, subsidiary information such as a map from a subsidiary information storage unit 209, and calculates the transfer pathway information of the autonomous mobile device 1 to submit the thus acquired transfer pathway information to the transfer pathway control unit 207. Here, the transfer pathway information contains the node information represented by the below-described map information (FIGS. 11, 12) and carries out a transfer pathway search using the map information. For example, Astar method can be employed as the transfer pathway search method using the node data (graph type) (for example, Non-patent Document, Kimio KANAI "Vehicle", Chapter 8, Colona Co.).

The driving information acquiring unit 206 acquires from the position transportation unit 100 a width (fixed), a position, a moving direction, a speed, and an accelerated velocity of the autonomous mobile device 1, positional information from a GPS, and, in addition thereto, the driving information representing actual conditions relating to the drive of the autonomous mobile device 1 to transmit all the information to the transfer pathway control unit 207. In the case where the autonomous mobile device 1 is a device moved by an operator, the transfer pathway information acquiring unit 205 can be omitted since the subsidiary information such as a map is not necessary. The position and the moving direction of the autonomous mobile device 1 can be acquired by adding the number of rotations of the wheels (acquired from encoder sensors), and a self-position estimating method using exterior sensors and a map can be used. Techniques of a camera, a LRF, or the like will be employable for the external sensors (for example, Non-patent Document, Kimio KANAI "Vehicle", chapter 8, Colona Co.). Also, the speed and the accelerated velocity of the autonomous mobile device 1 can be acquired from a differentiation of the number of rotations of the wheels and from a differentiation of the number of rotations of the wheels twice, respectively.

The transfer pathway control unit 207 prepares drive instruction information for driving and controlling the position transportation unit 100 based on the transfer pathway information, the operation control information, and the drive information, and transmits it to the movement control unit 208.

The movement control unit 208 drives and controls the position transportation unit 100 based on the thus received drive instruction information (for example, speed information and angular velocity information of the robot in its entirety). The position transportation unit 100 includes, for example, an actuator such as wheels and a motor and the control device, and performs a feedback control so as to have the speed and the angular velocity of the robot in its entirety reach target values and keep the target values by an output of the encoder provided in a motor (sensor for sensing information of the number of rotations) based on the driving instruction information. For example, a technique disclosed in a non-patent document in the names of Kan YONEDA, Takashi TSUBOUCHI, and Hisashi OKUMA, "Introductory Text for Robot Creation Design", Kodan-sha is employable for the transfer pathway control unit 207 and the movement control unit 208.

The autonomous mobile device 1 includes a program which has a computer execute a transfer information acquiring step, a subsidiary information acquiring step, a virtual obstacle setting step, and an obstacle avoidance step, and executes each of the steps of the operation relating to the collision avoidance with the person 2. The function of each step of the operation relating to the collision avoidance is achieved by a program for the autonomous mobile device which executes mechanical processing, electric circuit processing, and information processing, namely, by a hardware program and a software program.

The program for the autonomous mobile device includes a basic module and a plug-in module. The program comprising the transfer information acquiring step, the virtual obstacle setting step, and the obstacle avoidance step is the basic module, and the program comprising the subsidiary information acquiring step is the plug-in module. Here, the plug-in module modularizes the program in accordance with the varieties of the content of the subsidiary information such as a sub plug-in module relating to the individual information, a sub plug-in module relating to the map information, a sub-plug-in module relating to the event information, and the like. The plug-in module is separable or detachable from the basic module. Therefore, the subsidiary information can be acquired according to the usage of the autonomous mobile device 1 and thus various kinds of obstacle avoidance functions can be executed by selecting subsidiary information acquiring plug-in modules having different functions to attach to or detach from the basic module.

Figure 3:
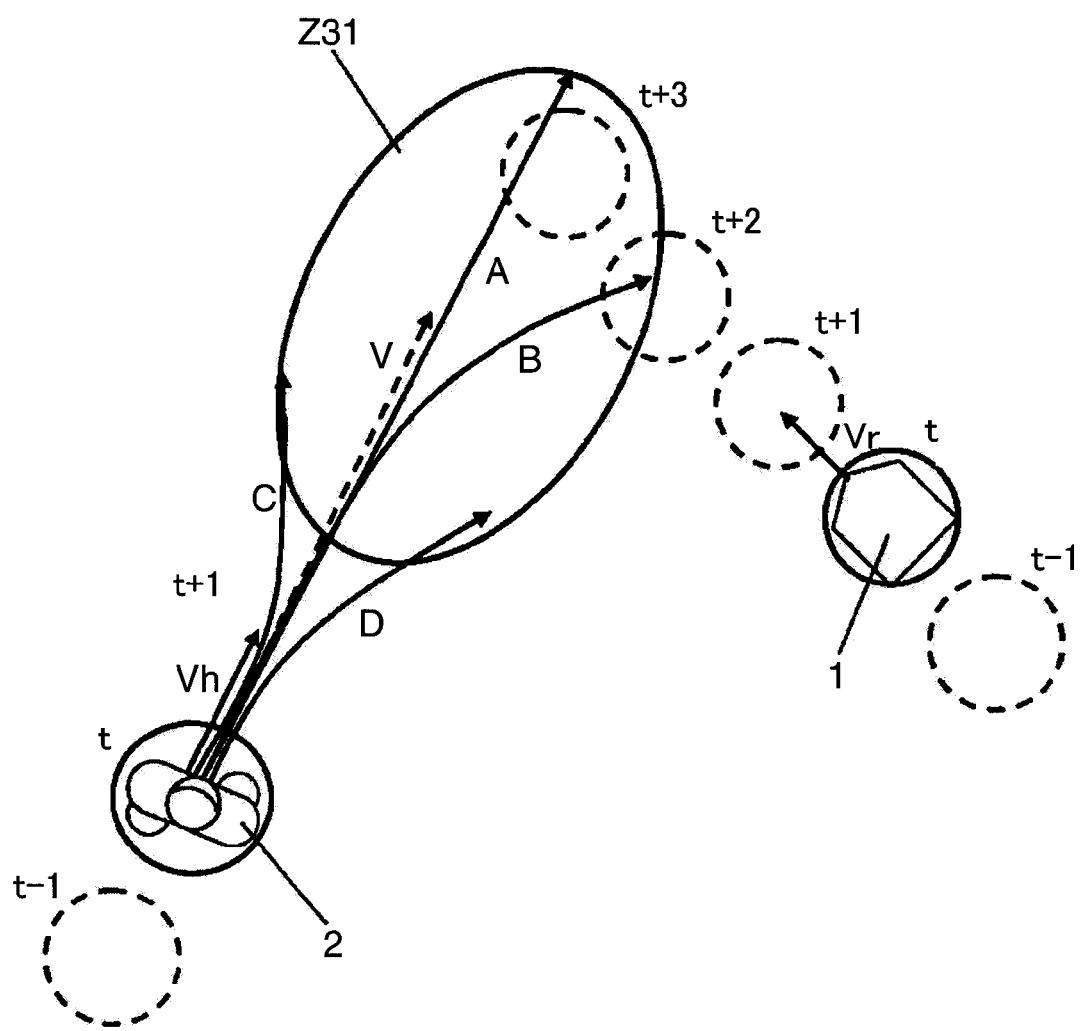
FIG. 3 illustrates a basic function of the autonomous mobile device of FIG. 1.

Now, a basic function of the autonomous mobile device 1 will be described with reference to FIGS. 3 to 5. FIG. 3 illustrates a basic function of the autonomous mobile device 1. The autonomous mobile device does not presume the movement of the person 2 in the form of the uniform linear motion V in a conventional manner, but presumes a plurality of potential pathways A to D to predict a region (virtual obstacle region) Z31 which is so presumed that the moving object would occupy from now on (for example, from a time t to a time t+1, t+2, t+3) as an obstacle with regard to the speed Vh of the person and controls the transfer pathway and the velocity Vr of the autonomous mobile device 1 in accordance with the above presumption to thereby avoid the collision with the moving object.

Now, an operation of a virtual obstacle setting unit 230 when there are a plurality of potential transfer pathways of the person 2 will be described below with reference to FIGS. 4 and 5. FIG. 4 is a flow chart, other than the one illustrated in FIG. 26, illustrating a process that the virtual obstacle setting unit 230 sets the virtual obstacle region by the movement of the person 2 in the relation between the person 2 and the autonomous mobile device 1. FIG. 5 illustrates a relation of the virtual obstacle region to be occupied due to the movement of the autonomous mobile device 1 and the person 2.

The autonomous mobile device 1 acquires the transfer information such as a position, a velocity vector, and an accelerated velocity vector of the person 2 through the transfer information acquiring unit 201 in step S100. Then, the autonomous mobile device 1 performs information processing based on the thus acquired transfer information and the subsidiary information such as the map or the like acquired by the subsidiary information acquiring unit 202, sets the plurality of potential transfer pathways with regard to the movement of the person 2 in step S102, and calculates a region where the person occupies when he/she walks with regard to the thus set plurality of transfer pathways in step S104. The autonomous mobile device 1 determines whether or not the thus calculated occupied region occupied by the person 2 and the thus calculated occupied region (circle) occupied by the autonomous mobile device 1 while it moves overlap with each other regardless where the autonomous mobile device 1 resides on its pathway in step S106. If the determination result is YES, the autonomous mobile device 1 calculates a time t+n and a position A1 (point on the pathway) at which the autonomous mobile device 1 contacts the person 2 when the person 2 walks at the maximum speed in step S108, and further calculates a position B1 (point on the pathway) at the time t+n when the person 2 moves at a current speed in step S110. On the other hand, if the determination result is NO in step S106, the autonomous mobile device 1 calculates the occupied region when the autonomous mobile device 1 moves at the current speed (region indicated by a circle), a time t+m and a position A2 (point on the pathway) where the autonomous mobile device 1 contacts the person 2, and a speed of the person 2 when he/she reaches the position A2 in step S112, and further calculates the position B2 (point on the pathway) at the time t+m when the person 2 moves at the current speed in step S114. The autonomous mobile device 1 calculates an equation of an ellipse having focus points at points A1, B1 and an ellipse having focus points at points A2, B2 based on the above calculation result, to thereby set the region within the ellipse as the virtual obstacle regions Z5A, Z5B of the person 2 in step S116. The autonomous mobile device 1 simulates a generation of sensor points in the virtual obstacle regions Z5A, Z5B, prepares the operation control information, and transmits the operation control information to the transfer pathway control unit 207 in step S118.

Figure 4:
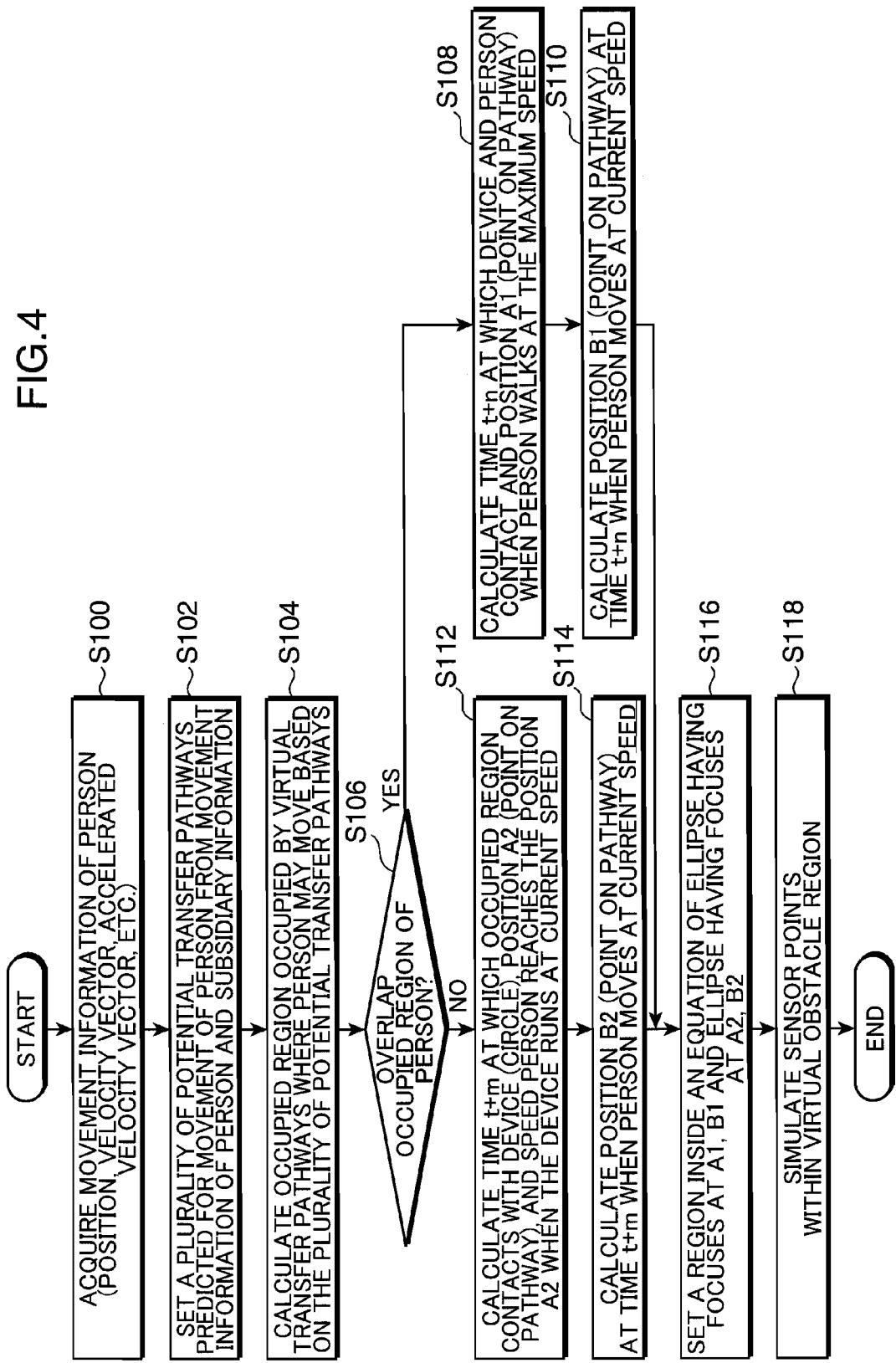
FIG. 4 is a flow chart illustrating a process of activities of the autonomous mobile device of FIG. 1.
Figure 5:
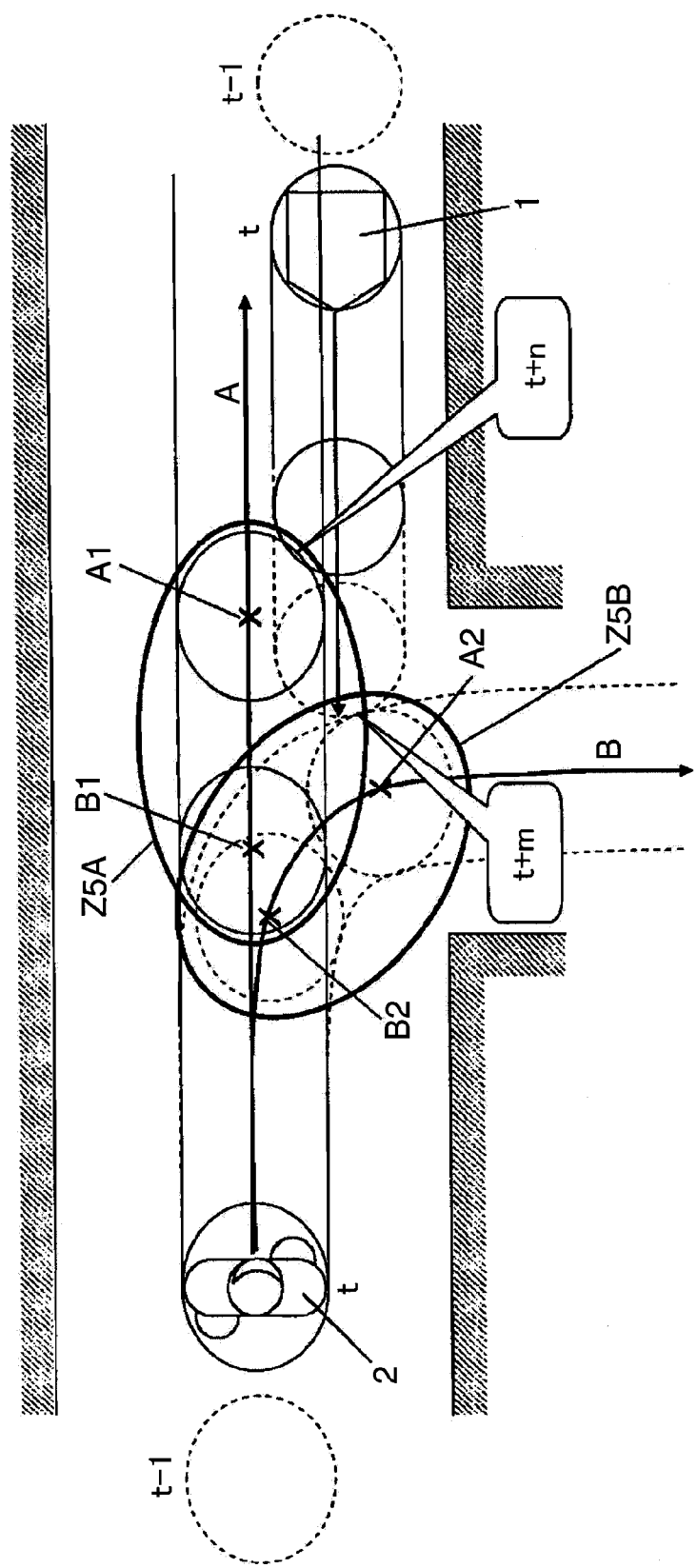
FIG. 5 illustrates a relation between a movement of a person and a virtual obstacle region in the autonomous mobile device of FIG. 1.

The virtual obstacle region may be calculated by, but not limited to, the steps of FIG. 4 (S104-S116). For example, it may be calculated by the method of FIG. 26 for every potential transfer pathway of the person 2.

FIG. 6 illustrates a method of simulating a generation of the plurality of sensor points at a boundary of the virtual obstacle region. As shown in FIG. 6, the sensor points are simulated on the boundary of the virtual obstacle regions Z6A, Z6B. The autonomous mobile device 1 sets the straight lines (imaginary lines) Lv extending radially and equally spaced (equiangularly) from the position of the obstacle detection unit 10 installed on the autonomous mobile device 1, and calculates intersection points between the imaginary lines Lv and a trapezoidal curved line indicating the boundary of the virtual obstacle regions Z6A and Z6B for every imaginary line Lv. Among the intersection points, the intersection points which are set on the boundary opposing to the autonomous mobile device 1 are simulated as the sensor points (illustrated by x in FIG. 6).

Figure 28:
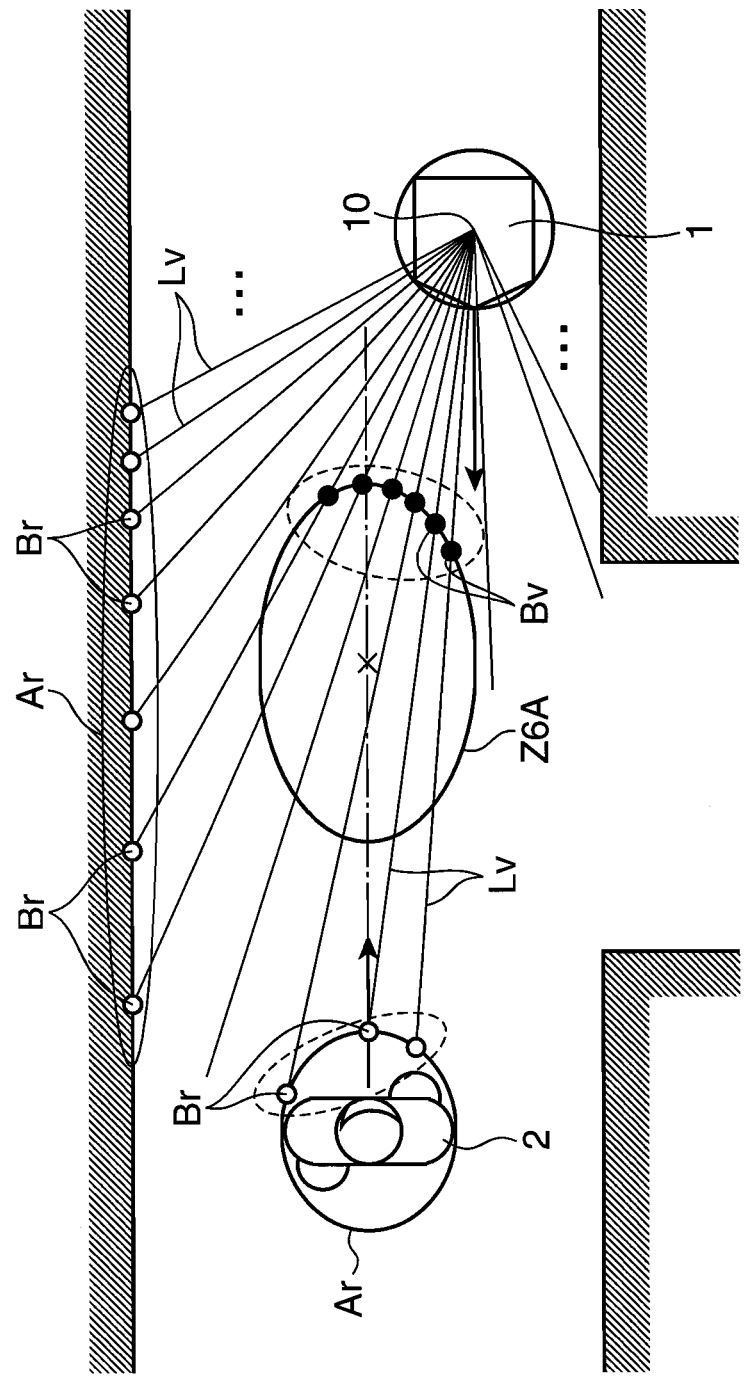
FIG. 28 illustrates a process of setting the sensor points.

As shown in FIG. 28, in the case where many imaginary lines Lv extending radially from the obstacle detection unit 10 are set, there may be such a case that two intersection points are found on one imaginary line Lv with regard to the boundary between this imaginary line Lv and the virtual obstacle region Z6A. In such a case, the intersection point nearer to the obstacle detection unit 10, namely, the intersection point at a side opposite to the autonomous mobile device 1, will be simulated as the sensor point. There also may be such a case where the obstacle detection unit 10 detects as the obstacle both of the stationary object and the moving object. In this case, there may be an intersection point Bv on the boundary between this virtual line Lv and the virtual obstacle region Z6A and an intersection point Br on the boundary between the virtual line Lv and the actual obstacle (for example, the person 2) on one virtual line Lv. In such a case, the intersection point nearer to the obstacle detection unit 10 may be employed as the sensor point. That is, simulation of the sensor points is carried out repeatedly at every predetermined time, such that to set the intersection point nearest to the autonomous mobile device 1 as the sensor point will suppress the amount of information to be stored in the storage unit from increasing while enabling easier collision avoidance with the obstacle.

The shape of the virtual obstacle region is not limited to the ellipse shape but may be a rectangular shape (oblong shape). Also, since the person 2 may not reach point A at a time t+m, the autonomous mobile device 1 evaluates and determines whether or not the person 2 can reach the point A.

Now, an application example of the function of the autonomous mobile device 1 will be described below with reference to FIGS. 7 to 9.

Figure 7:
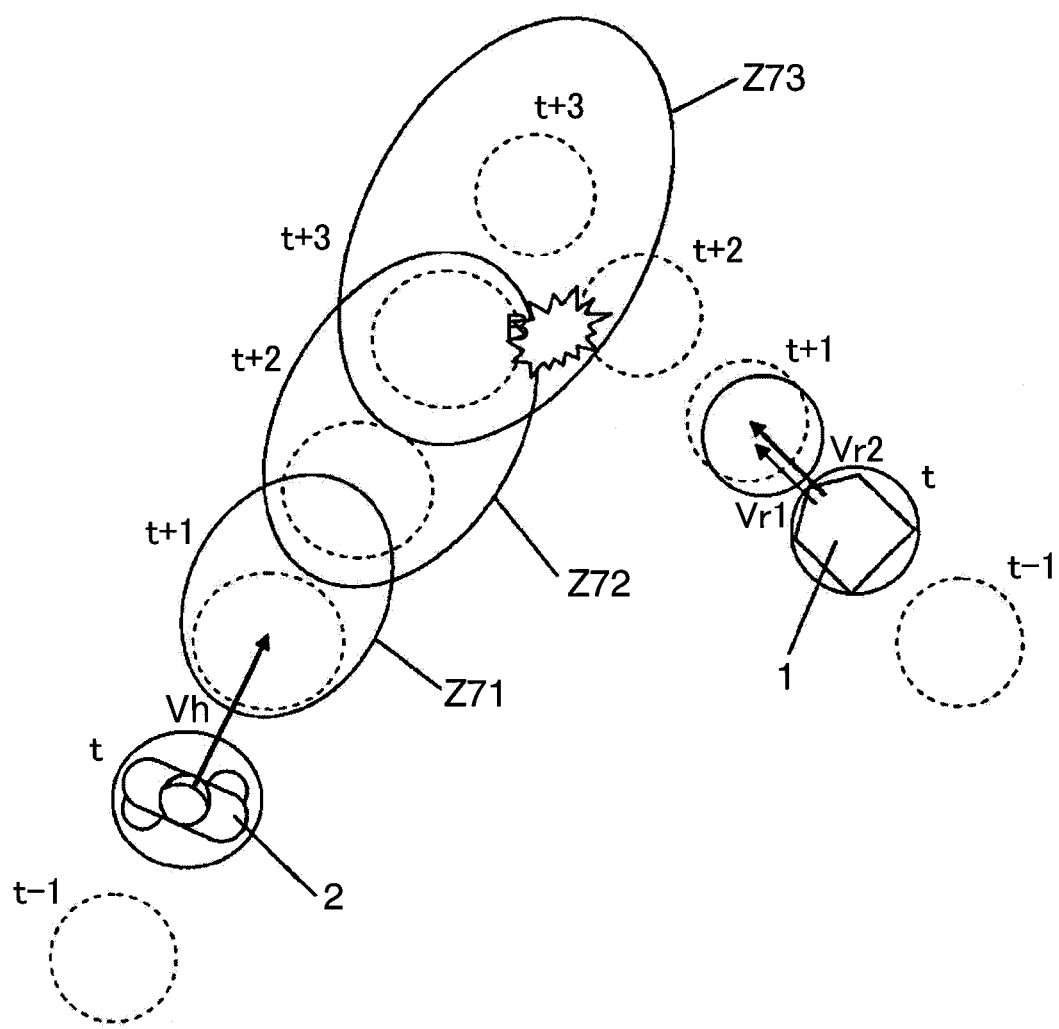
FIG. 7 illustrates an example of using accelerated velocity information to the autonomous mobile device of FIG. 1.

FIG. 7 illustrates a case example of carrying out a preliminary operation to avoid a collision considering an acceleration of the person 2. Here, the movement of the person 2 is predicted in the form of a linear motion involving an acceleration and deceleration. Provided that the person 2 normally walks at a speed of 1.0 m/sec., the accelerated velocity of the person 2 is 0.8 m/sec.$^2$, and the maximum walking speed of the person 2 is 1.6 m/sec., a traveling distance of the person 2 will become 1.0-1.4 m after 1 second, 2.0-3 m after 2 seconds (the maximum walking speed reaches 1.6 m/sec.), and 3.0-4.6 m after 3 seconds. In view of the above, in FIG. 7, the virtual obstacle region of the person 2 at the time t+1, the time t+2, and the time t+3 with regard to the time t can be represented by Z71, Z72, and Z73, respectively. If the autonomous mobile device 1 keeps moving at a speed of, for example, 1 m/sec., the autonomous mobile device 1 comes close to the person 2 after 2 seconds and they collide with each other immediately thereafter. Therefore, the autonomous mobile device 1 decelerates in order to avoid the collision. Provided that the autonomous mobile device 1 has the maximum deceleration velocity of 1 m/sec.$^2$ and if the autonomous mobile device 1 decelerates at this maximum deceleration speed, the autonomous mobile device 1 will stop at a position after it moves by 50 cm from a current position after 1 second and thus will not collide with the person 2.

Figure 8:
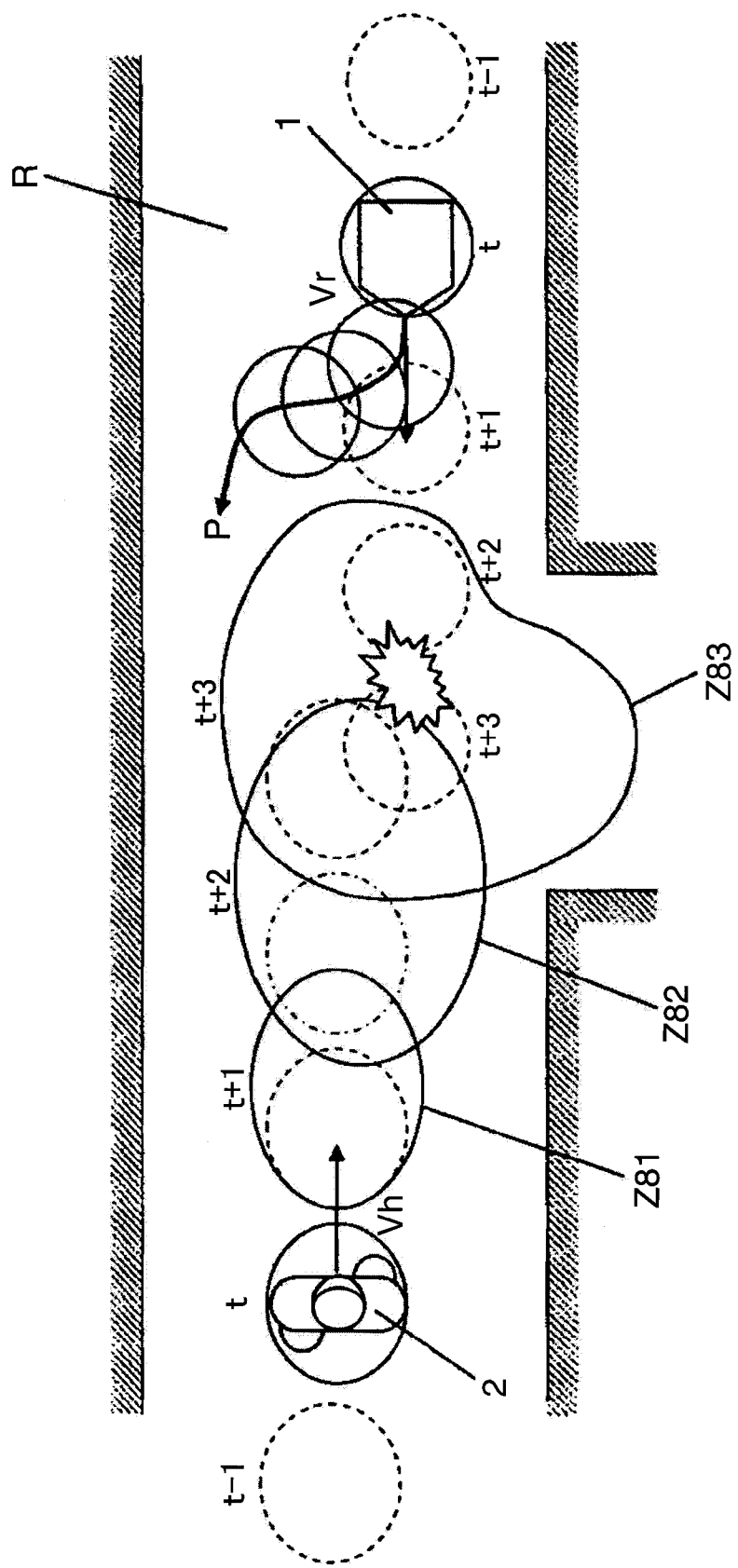
FIG. 8 illustrates an example of using map information to the autonomous mobile device of FIG. 1.

FIG. 8 illustrates a case example that the autonomous mobile device 1 preliminary carries out an operation to avoid a collision with the person 2 by using a map as the environment information. In this case example, a direction in which the person 2 travels will be predicted in consideration of the information as to a crossed pathway R as the environment information in addition to the linear motion involving the acceleration and deceleration of the person 2 as shown in FIG. 7. A mutual positional relation between the person 2 and the autonomous mobile device 1 is identical to the case exemplified in FIG. 6, whereas, in the present case, the autonomous mobile device 1 has the environment information as to the pathway R as the subsidiary information, such that the autonomous mobile device 1 can move independently within a movable area of the pathway.

The autonomous mobile device 1 predicts the virtual obstacle region of the person 2 based on the environment information as to a shape of the pathway or the like together with the factors of the movement of the person 2, and thereby determines the virtual obstacle region of the person 2 to prepare operation control information necessary for the autonomous mobile device 1 to avoid a collision with the person 2.

FIG. 8 illustrates that the autonomous mobile device predicts, at the time t+3, virtual obstacle regions Z81, Z82, and Z83 of the person 2 at the time t+1, the time t+2, and the time t+3 with regard to two pathways in the case where the person 2 linearly travels while he/she accelerates from the current time t and the case where the person 2 turns right at a T-shaped intersection of the pathway, and pulls up short or stops at a position P where the autonomous mobile device 1 turns right and takes shelter.

In the above-described case example, the autonomous mobile device 1 predicts a plurality of transfer pathways as to the movement of the person 2, and sets its course to a predictable pathway having the least possibility of collision. Also, in such a case where it is difficult for the autonomous mobile device 1 to select the pathway because of a problem that the autonomous mobile device 1 will invade into the virtual obstacle region Z83 of the person 2 if it will keep going at the current speed, the autonomous mobile device 1 predicts the next transfer pathway after it decelerates or stops to check the transfer pathway of the person 2.

The person 2 may turn a corner at a fork road if there is a fork road in the pathway, and also the person 2 may go to see a bulletin board if there is a bulletin board along the pathway. Therefore, the autonomous mobile device 1, in predicting the transfer pathway, selects the pathway taking those factors also into consideration. In the case of a crossroad, the autonomous mobile device 1 selects the pathway in a similar method and process as those carried out in the fork road.

Figure 9:
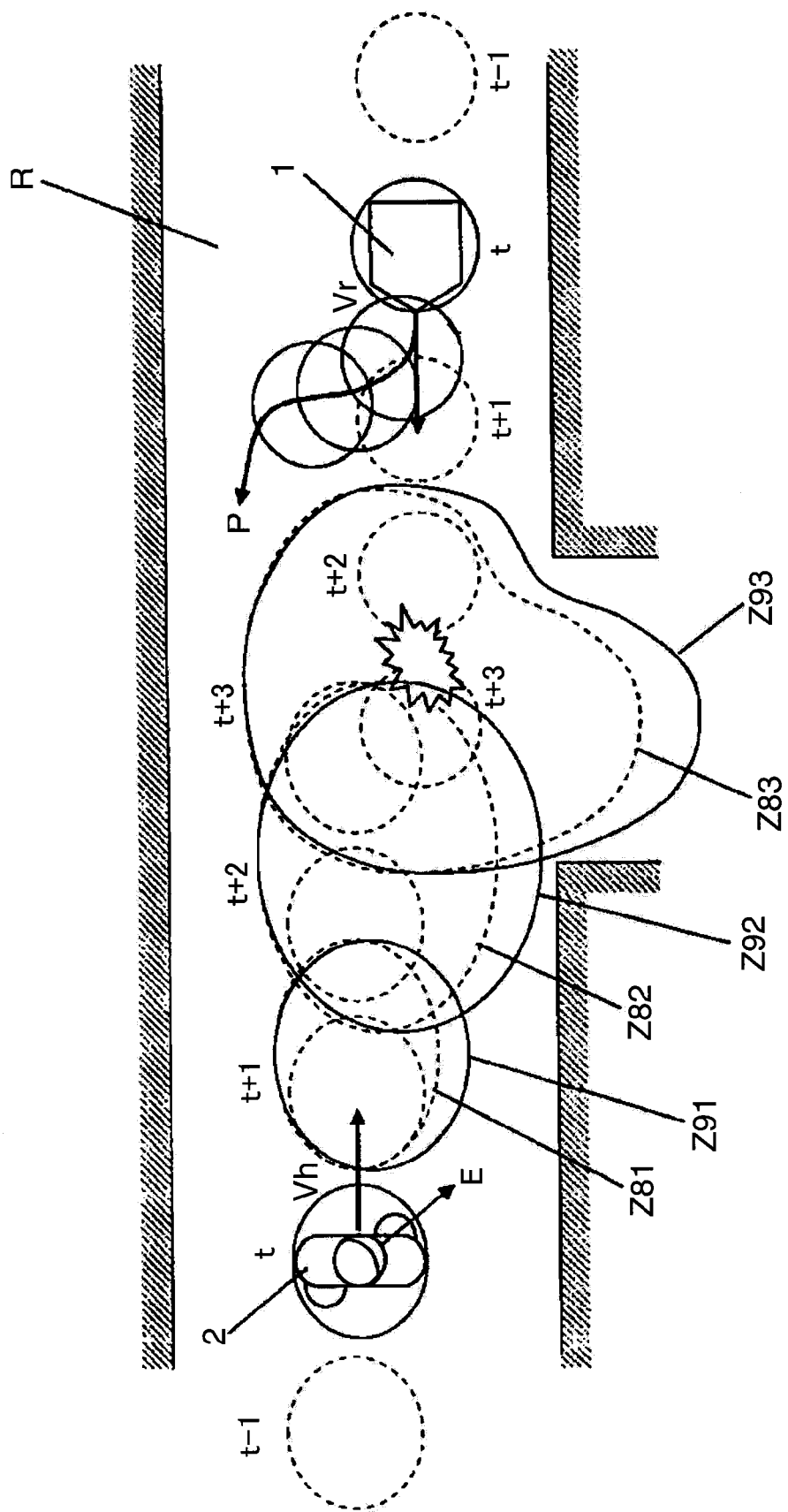
FIG. 9 illustrates an example of using line of sight information to the autonomous mobile device of FIG. 1.

FIG. 9 illustrates a case example in which the autonomous mobile device 1 preliminary takes a collision avoidance operation with regard to the person 2 by using the height information of the person 2 in addition to the eyes or the face orientation of the person 2 as the attribute information (individual information) of the person 2. In this case example, the autonomous mobile device 1 predicts a direction in which the person 2 travels in consideration of the information as to the eyes of the person 2 in addition to the information as to the linear movement involving the acceleration and the deceleration and the intersecting pathway R. The person 2 moves in a direction he/she is now taking his route or in a direction he orients his/her eyes or his/her face with a high possibility, while the person 2 would not take his/her route to a direction he/she is not viewing. A mutual positional relation between the person 2 and the autonomous mobile device 1 is identical to what is illustrated in the case example of FIG. 8. However, in the present case example, the autonomous mobile device 1, upon generating the possible transfer pathways of the person 2, calculates them based on the information as to the eyes of the person 2 together with the factors relating to the movement of the person 2 to thereby determine the virtual obstacle region of the person 2, resulting in preparing the operation control information necessary for the autonomous mobile device 1 to avoid the collision with the person 2. FIG. 9 illustrates that the autonomous mobile device 1 predicts, at the time t+3, the virtual obstacle regions Z91, Z92, and Z93 of the person 2 at the time t+1, the time t+2, and the time t+3 with regard to two pathways such as a pathway that the person 2 takes his/her route to a direction he/she orients his/her eyes while the person 2 accelerates his/her walking speed from the current time t and a pathway that the person 2 turns right at the T-shaped intersection in the pathway, and pulls up short or turns to the right to stop at the sheltered position P. In FIG. 9, the virtual obstacle regions of the person 2 at the time t+1, the time t+2, and the time t+3 are the Z91, the Z92, and the Z93, respectively, which are expanded in the direction of the sight line E of the person 2 in comparison with the virtual obstacle regions Z81, Z82, and Z83 of the person 2 in which the direction of the sight line E of the person 2 is not considered.

Figure 10:
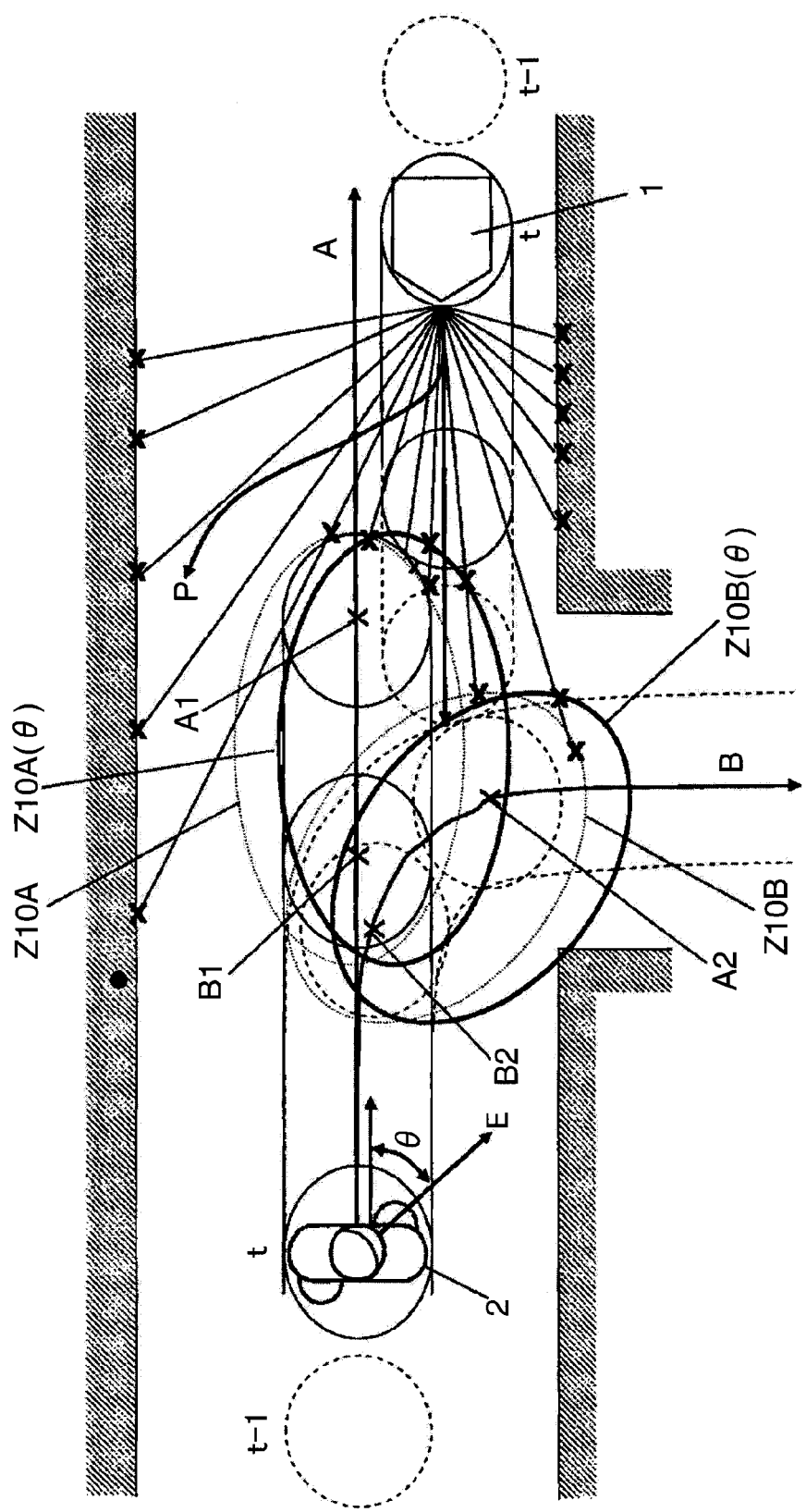
FIG. 10 illustrates an example of using event information to the autonomous mobile device of FIG. 1.

FIG. 10 illustrates a case example in which the autonomous mobile device 1 has the virtual obstacle region of the person 2 move parallel to a direction perpendicular to the movement direction of the sight line E in accordance with a degree of gradient of the sight line E. In FIG. 10, the autonomous mobile device 1 sets a certain degree of gradient with regard to a gradient angle $\theta$ of the certain degree of gradient×sight line E, and has the virtual obstacle regions Z10A, Z10B move parallel in a direction of right angles with regard to the moving direction of the person 2 by the certain degree of gradient× sin $\theta$, to create virtual obstacle regions Z10A ($\theta$) and Z10B ($\theta$).

When using the height information, the autonomous mobile device 1 may determine that a tall person is an adult, and therefore expands the virtual obstacle region in his/her traveling direction since an adult may walk faster, whereas the autonomous mobile device 1 may determine that a short person is a child, and therefore, expands the virtual obstacle region in a direction orthogonal to his/her traveling direction since a child may suddenly change his/her walking direction to any direction around him/her.

Now, a method of generating a sheltered pathway using the event information and the person identification unit 7 to prepare the operation control information according to another application example of the autonomous mobile device 1 of the present embodiment will be described below.

The event information is the information as to going to work and shopping, entering or leaving management of a specific area, various festivals, or the like, which links a person with a time, a place, a pathway, and the like. The autonomous mobile device 1 specifies the time, the place, the pathway, and the like, and carries out an avoidance operation while it predicts a behavior pattern of the person based on the thus linked information. The identification of a person is carried out by a function of identifying the person 2, for example, a face authentication, of the person identification unit 7. Before and after the time contained in the event information, the person 2 may move to a place relating to the event information, namely, may move along a specific pathway with a high possibility, such that the autonomous mobile device 1 will set the virtual obstacle in such direction in order to expand a predictable range. Accordingly, since the virtual obstacle is set including the pathway which the person 2 may go along with a high possibility, the autonomous mobile device can avoid a collision with the person 2 if the person 2 suddenly changes his/her direction.

In the case of an apartment having an auto lock type doorway, only the residents of the apartment can enter therein and others cannot. Also, since an entrance door of the concert hall will open in accordance to when the performance begins, the possibility that person 2 enters the entrance door becomes higher close to when the performance begins. In the event information as to going to work or shopping, the behavior patterns of the specified person with regard to the time, the place, the pathway, and the like on his/her way to the office or while shopping will be registered in order to use it for generating the sheltered pathway. To the contrary, when the specified person comes home from the office or shopping, the pathway to a house door of the person 2 will be generated as the most potential transfer pathway.

Figure 11:
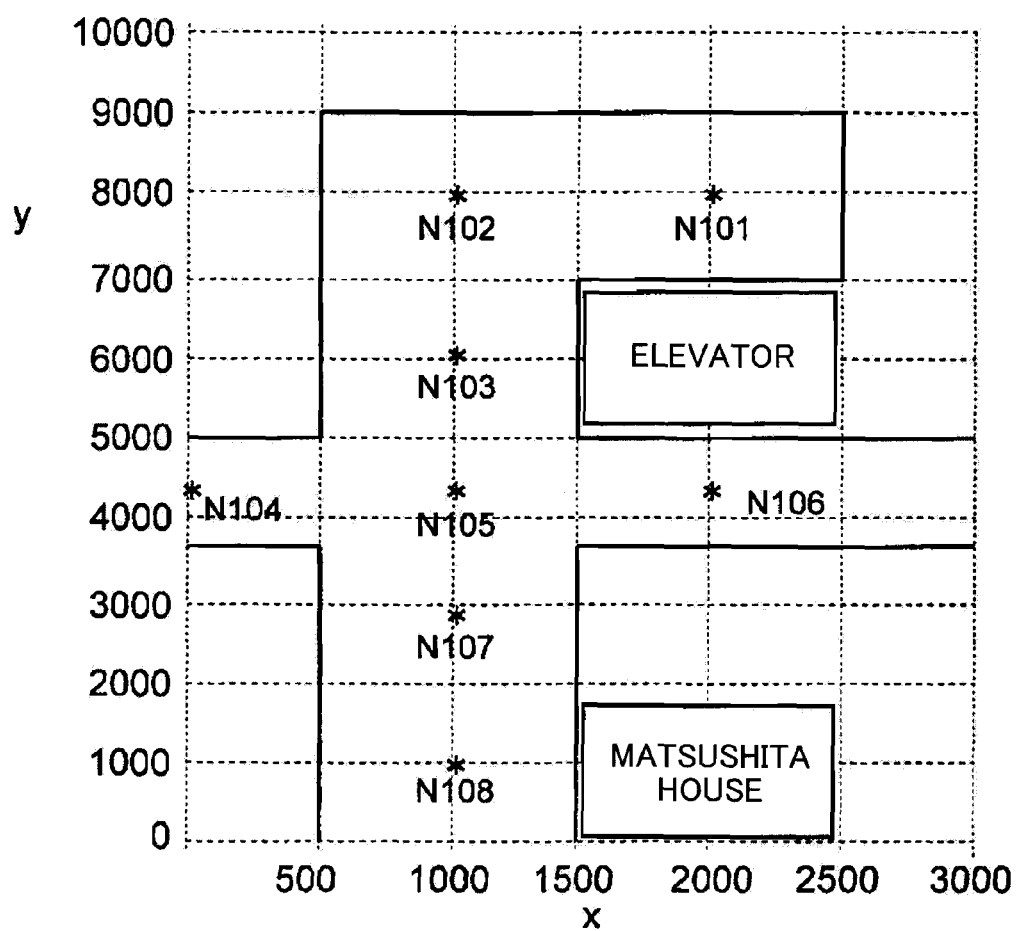
FIG. 11 illustrates an example using an environmental map to the autonomous mobile device of FIG. 1.

Now, an example of the map information will be described below with reference to FIGS. 11 and 12. FIG. 11 illustrates an example of an environmental map, and FIG. 12 illustrates an example of a connection node for the pathway.

FIG. 11 illustrates the environmental map in which, for example, a passage way of a certain floor of an apartment is illustrated in a two-dimensional plane (X-Y plane). * denotes a node to which coordinates, the number of nodes adjacent to it, and a node number are allotted.

FIG. 12 illustrates an example of node data 301. In other words, the node data is illustrated in a graph, and the pathway between two nodes can be acquired through, for example, an A* algorithm or the like in a similar manner described above with regard to the pathway generation of the autonomous mobile device 1, and the pathway of the autonomous mobile device 1 itself according to the present embodiment can also be acquired based on the node data 301. Similarly, the current position of the person 2 can be acquired from a relational position of the person 2 viewed from the autonomous mobile device since the autonomous mobile device itself always holds its own position, resulting in that the node nearest to the autonomous mobile device will be the current node of the person 2. And, the possible pathways of the person 2 can be acquired based on the target node of the person 2.

FIG. 13 illustrates an example of the event information. FIG. 13A illustrates an example of an event information format in which the event information contains the Ne(>0) number of event data, and $i^{th}$ event data contains at least a time (tei) at which the event occurs, a person ID (Hi), and a node number (Ni) to which the person travels.

Figure 14:
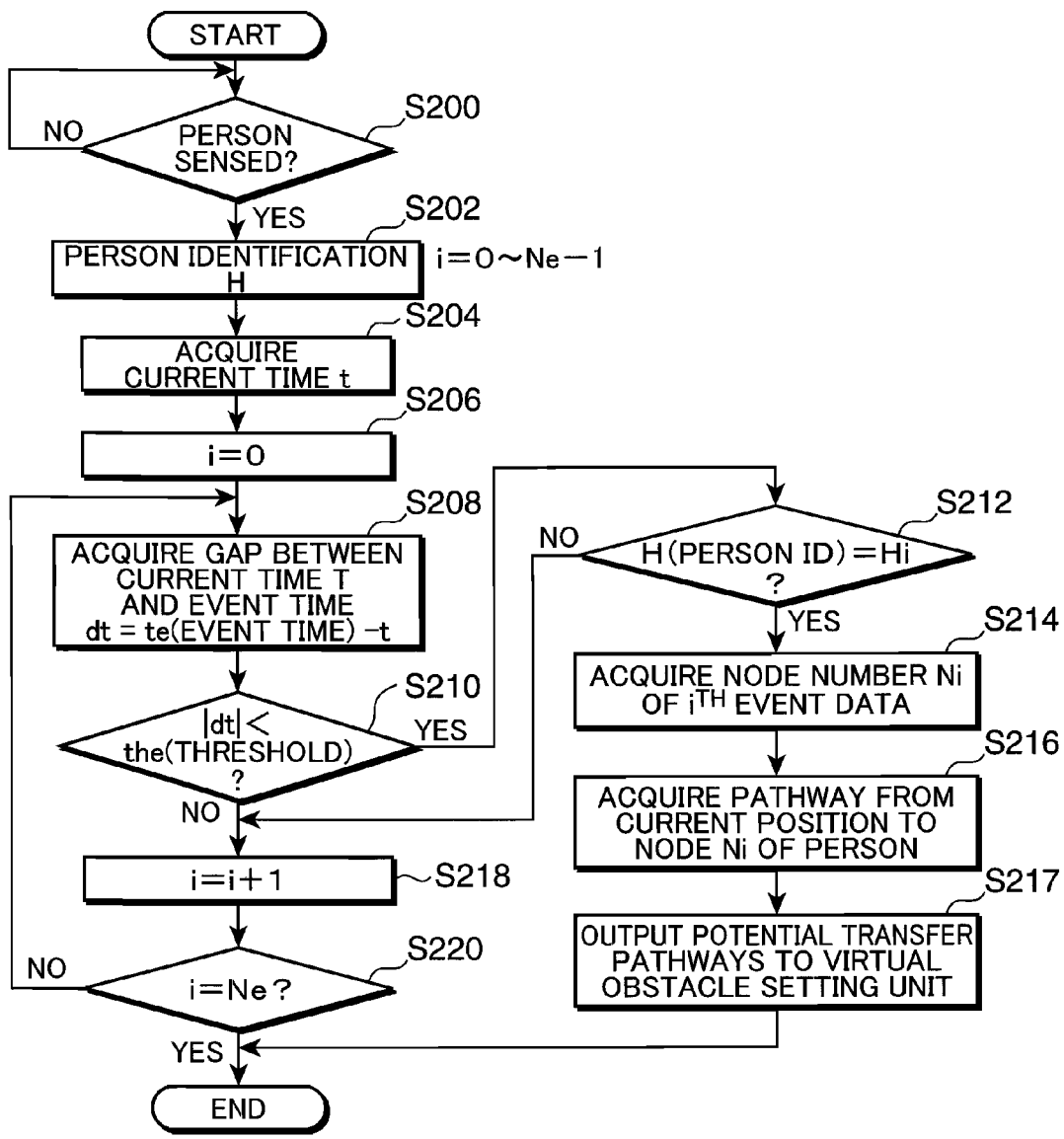
FIG. 14 is a flow chart illustrating a process of acquiring potential transfer pathways of a person using a person identification and the event information to the autonomous mobile device of FIG. 1.

FIG. 14 is a flow chart illustrating an exemplary process of acquiring the potential transfer pathways of the person using the event information 302 (FIG. 13B) and a person identification function of the person identification unit 7. When the obstacle sensing unit 10 senses the person 2 in step S200, the person identification unit 7 identifies the person 2 to acquire the person ID (H) in step S202, and further acquires the current time t from a clock device (not shown) such as a timer in step S204. Then, the event data is viewed one by one for each event information stored in the event information 302 in step S206. If a gap |dt| between an event time (te) and the current time (t) is smaller than a predetermined threshold the, then in step S210, the autonomous mobile device 1 determines whether or not the person ID (H) as a result of the person identification by the person identification unit 7 complies with the person ID (Hi) of the event data in step S212. If the person ID complies with the person ID (Hi) of the event data, the autonomous mobile device acquires the node number Ni of the $i^{th}$ event data in step S214, calculates the pathways from the current position of the person to the above node number Ni (for example, by the Aster method), and sets them as the potential transfer pathways in step S216. The potential pathways will be transmitted to the virtual obstacle setting unit 230 in step S217. If the gap |dt| between the event time (te) and the current time (t) is larger than the predetermined threshold the or the person ID (H) as a result of the person identification result does not comply with the person ID (Hi) of the event data, the autonomous mobile device 1 will check the next event data in steps S218 and S220.

Here, if there is event data which satisfies two conditions, such as the gap |dt| between the event time (te) and the current time (t) is smaller than the predetermined threshold the and the person ID (H) as a result of the person identification complies with the person ID (Hi) of the event data, it is preferable to employ the event data having the minimum gap |dt| between the event time (te) and the current time (t) among the event data which satisfies the above two conditions to set the potential transfer pathways of the person.

Figure 15:
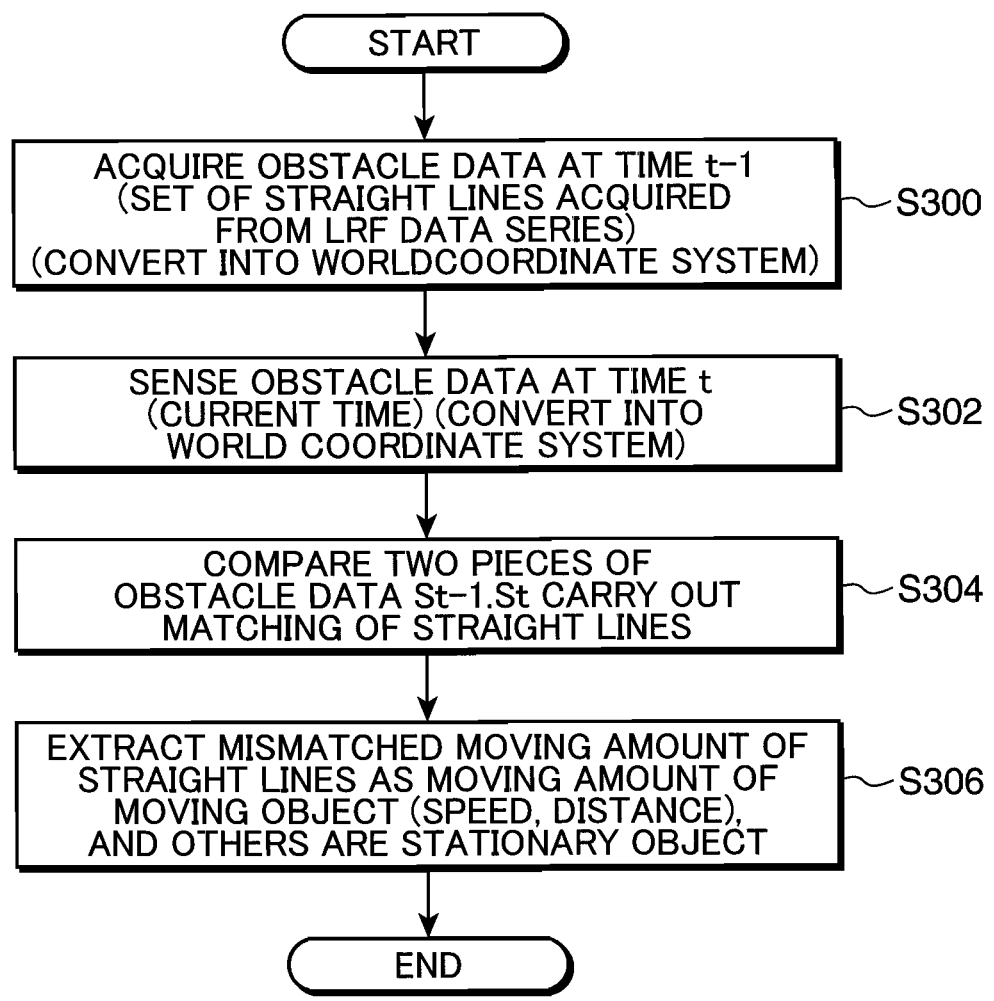
FIG. 15 is a flow chart illustrating a process of sensing actions of the person when the LRF is used in a moving object sensing unit of the autonomous mobile device of FIG. 1.
Figure 16B:
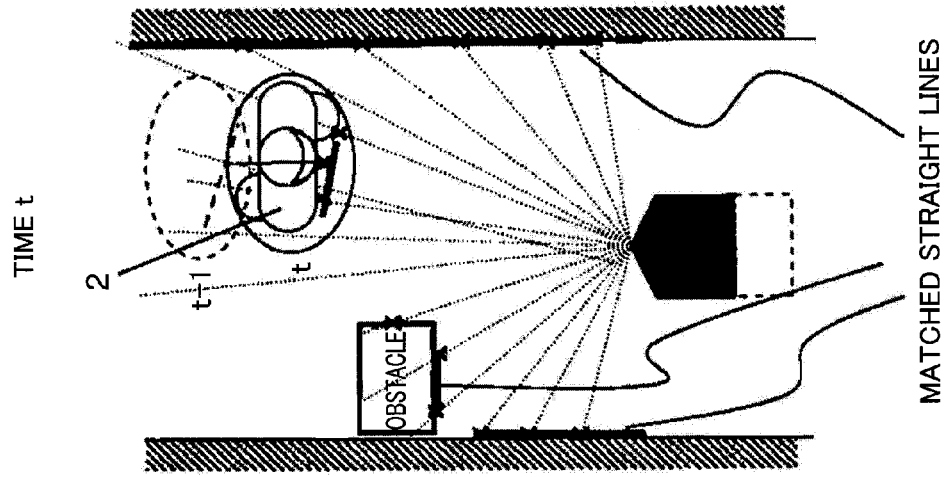
FIG. 16 illustrates a method of sensing the person when the LRF is used in the moving object sensing unit of the autonomous mobile device of FIG. 1.

Now, a method of sensing the person 2 when using the LRF in the obstacle sensing unit 10 will be described below in detail with reference to FIGS. 15 and 16. FIG. 15 is a flow chart illustrating a process of sensing the person 2 when the LRF is used in the obstacle sensing unit 10. FIG. 16 illustrates a method of sensing the person 2 when the LRF is used in the obstacle sensing unit 10. The LRf used herein is a flat-scan type LRF and is mounted to a lower front side of the autonomous mobile device 1.

Figure 16A:
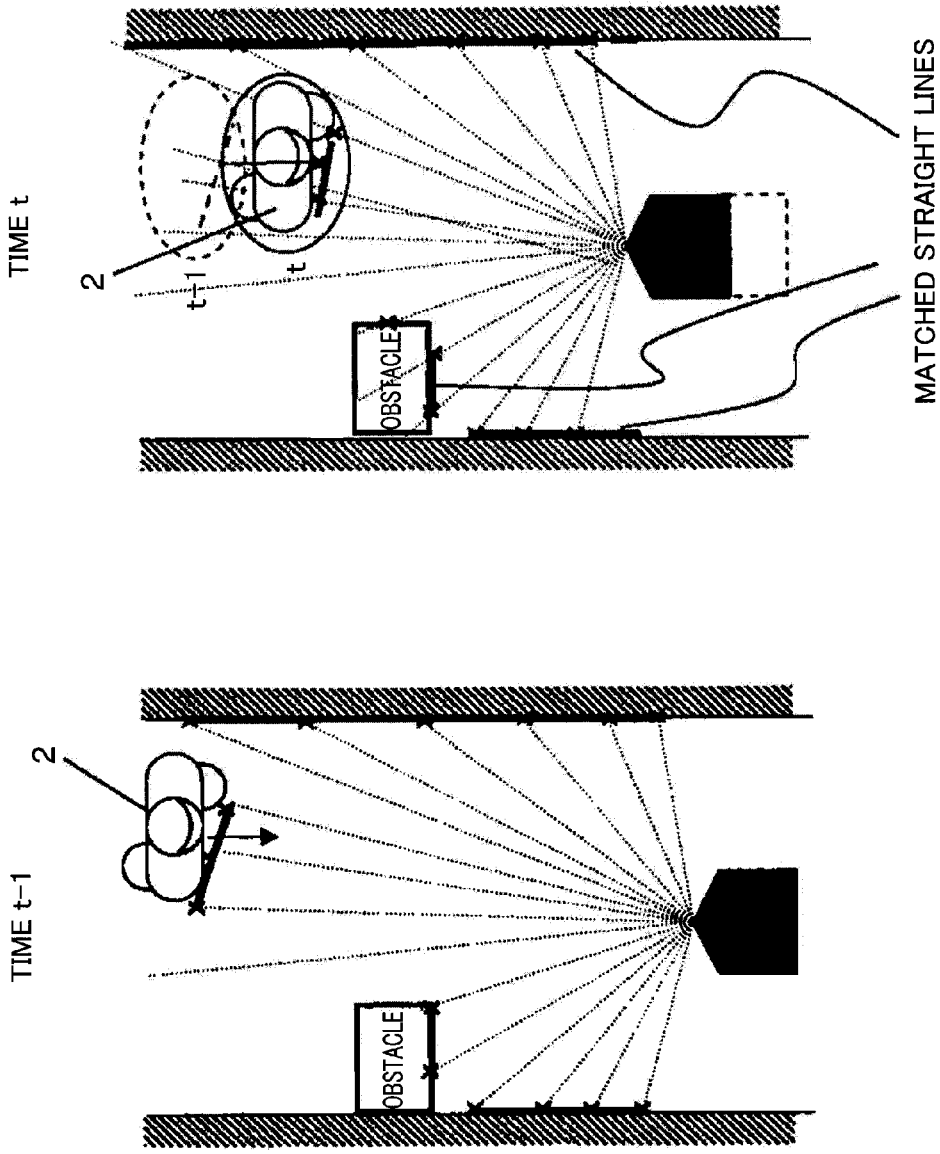

As shown in FIG. 15, the obstacle sensing unit 10 acquires LRF data at the time t−1. FIG. 16A illustrates the LRF data at the time t−1. The LRF data, which acquires distance data of a constant angular space, acquires all the straight lines longer than a predetermined length and comprising continuous distance data among the above acquired distance data sequence in the form of a world coordinate system. In order to acquire the straight lines, for example, a Hough conversion can be employed in step S300.

Then, the obstacle sensing unit 10 acquires the LRF data and the straight line data straight line (FIG. 16B) at the time t after a certain time has passed in step S302 in a similar manner. The obstacle sensing unit 10 senses the obstacle according to the steps S300 and S302.

Subsequently, the obstacle sensing unit 10 carries out a matching of the LRF data at the time t−1 and the time t, respectively, in step S304. In order to carry out the matching of the straight lines, a combination having a certain constant gap between the straight lines of a distance from coordinates of the world coordinate to the straight line and an increment of the straight line is searched, and, if the sum of the distance between the LRF data points corresponding to the one used for acquiring the straight line is less than a certain value, they are considered as being matched.

In view of the above, the one of which matching of the straight lines and the distance data belonging to the straight lines was not successful is determined as the moving object which moved between the time t−1 and the time t. The velocity vector can be acquired based on the distance and the time in step S306. According to the steps S304 and S306, the moving object can be separated from the stationary object. Accordingly, the moving object sensing unit 12 can sense the moving object. On the other hand, the one of which matching of the straight line and the distance data belonging to the straight lines was successful can be separated from the moving object as the stationary object. Accordingly, the stationary object detection unit 13 can sense the stationary object.

The autonomous mobile device 1 according to the present embodiment naturally includes a central processor (CPU), a memory for processing information such as a ROM, a RAM, and a data storage device (record medium, exterior storage device such as a storage medium, a HDD, and the like) which are necessary to realize the function of the autonomous mobile device 1.

The subsidiary information and the program according to the subsidiary information, which are used in the autonomous mobile device 1 according to the present embodiment, are preliminarily stored in an interior storage unit of the autonomous mobile device 1 and can be updated through the exterior device. Upon updating these, the subsidiary information and the program according to the subsidiary information is downloaded from the external device to update the subsidiary information and the program according to the subsidiary information.

As described above, the autonomous mobile device 1 according to the embodiment of the present invention acquires the transfer information representing the actual conditions of the person 2 with regard to the movement of the person 2 which cannot be predicted with a line from the transfer information and the subsidiary information comprising the environment information such as map information representing the factors relating to the movement and the individual information such as the sight line, the face orientation, and the height information, and the event information, sets the virtual obstacle region of the person 2 based on the thus acquired transfer information and the subsidiary information, and can prepare the operation control information to the virtual obstacle region in order to avoid a collision with the person 2. Therefore, the collision with the person 2 is avoidable by driving the autonomous mobile device 1 based on the operation control information. Consequently, such a safe autonomous mobile device that can carry out a secure evasive action to the person 2 can be realized. The autonomous mobile device 1 can be applied to a robot or the like which can astronomically move with its own determination of the circumstances, thereby realizing a safe robot for carrying out a secure evasive action to the person 2. The autonomous mobile device also can be applied to a nursing-care electrical wheel chair operated by a person. If the person is an aged individual, there may be a case where a collision occurs due to a delay of the determination. In this case, the autonomous mobile device 1 is configured to be cooperative with an operation of the person to assist the autonomous mobile device such that it can avoid a collision.

In the autonomous mobile device 1 according to the present embodiment, the moving object was exemplified as, but not limited to, a person. The above-described effect can be produced even if the moving object is an autonomous mobile robot which can determine a situation by itself.

Also, the autonomous mobile device 1 and the collision avoidance control device 200 is applicable to a robot, a vehicle, an electric wheel chair such as a senior cart which requires an operation to avoid the obstacle (a person as a moving object or a stationary obstacle).

As described above, the collision avoidance control device includes the transfer information acquiring unit for acquiring the transfer information representing the actual conditions of the movement of the moving object, a subsidiary information acquiring unit for acquiring the subsidiary information representing the factors relating to the movement of the moving object, the virtual obstacle setting unit for setting the virtual obstacle region based on the transfer information and the subsidiary information; and the obstacle avoidance control unit for avoiding a collision with the moving object based on the virtual obstacle region.

With the above-described configuration, the autonomous mobile device 1 considers the moving object as an obstacle, thus determines that the moving object will take a specific pathway with a high possibility from the subsidiary information, sets the virtual obstacle region on the predicted pathway, and can set a region having higher possibility where the moving object finally reaches. Accordingly, since the virtual obstacle region is set to the pathway having the higher passing-through possibility predicted based on the subsidiary information in addition to the pathways predicted linearly from the speed and the accelerated velocity of the moving object, the collision avoidance control device which can avoid a collision even if the moving object suddenly changes his/her direction to an unpredictable direction can be realized, thereby realizing a robot having a safe and easy moving performance.

In the present embodiment, the transfer information acquiring unit acquires the information as to the velocity vector and the accelerated velocity vector of the moving object.

With such a configuration, the autonomous mobile device can acquire the information as to the actual conditions of the movement of the moving object from the information relating to the velocity vector and the accelerated velocity vector and further acquire a basic pathway for obtaining the possible pathways of the moving object which are used for setting the virtual obstacle region, thereby enabling the autonomous mobile device to avoid the thus set virtual obstacle region. As such, such an autonomous mobile device having a safe and easy moving performance for the moving object (person or the like) can be realized.

Also, in the present embodiment, the virtual obstacle setting unit includes the potential transfer pathway generation unit for generating the plurality of potential transfer pathways of the moving object based on the thus acquired transfer information and the subsidiary information, and sets the virtual obstacle regions based on the plurality of potential transfer pathways.

With such a configuration, the plurality of potential transfer pathways in which the moving object may travel with a high possibility are acquired to set the virtual obstacle regions corresponding to these potential transfer pathways, such that the autonomous mobile device can preliminary avoid the transfer pathways or the moving directions in which the moving object may pass through with a high possibility. As such, an autonomous mobile device having a safe and easy moving performance to the moving object (person and the like) can be realized.

Also, such a configuration may be optional that the obstacle region generated based on the transfer information and the obstacle region generated based on the subsidiary information are combined to set the virtual obstacle region.

With such a configuration, since the obstacle region generated based on at least one of the subsidiary information among the environment information (map or the like), the information of a person (sight line, face orientation, height, and the like), the event information, and the like is added to the obstacle regions generated based on the transfer information, the obstacle regions are set to the pathways or the moving directions which have a high possibility of collision with the moving object, such that the operation control to avoid the region can be carried out, which further enhances the safeness of the device.

As described above, the subsidiary information may be the environment information representing the factors relating to a geographical point. Furthermore, the operation control can be carried out reflecting the conditions relating to the geographical points. Therefore, the autonomous mobile device can predict the pathway of the moving object taking the ambient geographical conditions into consideration, thereby realizing a safer and easier collision avoidance control device.

As has been described above, the environment information is the map information and the potential transfer pathway generation unit may generate the plurality of transfer pathways based on the map information. Accordingly, a range of the virtual obstacle region can be expanded from the map information and thus preciseness in avoiding a collision can be enhanced.

As described above, the moving object may be a person. Accordingly, the autonomous mobile device can carry out the operation control of the collision avoidance with regard to the person. Therefore, such configuration is applicable to a device which can provide the most carefulness and easiness in the environment involving person.

As described above, the subsidiary information may be the individual information (representing who he/she is or the like) representing factors relating to the person. Accordingly, the autonomous mobile device can carry out the operation control of collision avoidance using the individual information relating to the person. Therefore, the device can provide a precise and proper operation control for collision avoidance with regard to a specified person.

As described above, the individual information may be the height information. Accordingly, the autonomous mobile device can carry out the operation control to properly avoid a collision based on this height information and can set a larger virtual obstacle region for a child than that of an adult considering that it is hard to predict the pathway of a child, namely, can carry out a different avoidance control between a child and an adult when the child or the adult walks past the autonomous mobile device, thereby carrying out a safe and easy operation control of a collision avoidance even for a child according to the difference between the adult and the child without bearing an unnecessarily large detour.

Also, as described above, the virtual obstacle setting unit may expand the virtual obstacle region in a direction orthogonal to a direction the person travels in accordance with the height information. Accordingly, the autonomous mobile device determines, for example, that a short person is a child from the height information to thereby carry out the operation control with enhanced safety with regard to the direction in which the child may go.

As described above, the individual information is the information relating to the sight line or the face orientation of the person, and the virtual obstacle setting unit may expand the virtual obstacle region in accordance with the direction of the sight line or the direction of the face orientation. With such a configuration, the autonomous mobile device further determines that the person may move in the direction of the sight line or the direction of the face orientation with a high possibility, and therefore sets the pathways provided that the person moves in such direction, resulting in carrying out the operation control to avoid the pathways. In this manner, a person's will which is hardly predictable is presumed based on his/her sight line and his/her face orientation to thereby carry out an enhanced safe operation control.

As described above, the subsidiary information may be the event information representing the factors relating to the event. Accordingly, the autonomous mobile device can carry out the operation control to avoid a collision reflecting the factors as to the event. For example, when a concert hall is opened at a certain time, the autonomous mobile device determines that a person tends to move to the doorway of the hall at this time with a high possibility and therefore sets the pathway in the case where the person moves to the doorway, thereby being able to carry out the operation control to avoid the pathway.

Also, the event information is the information in which the event time information and the event site information are linked to each other, and the autonomous mobile device may set the virtual obstacle region according to a gap between a time at a predetermined position and the event time information. Accordingly, the autonomous mobile device determines that the person will move to a direction where the event is held with a high possibility since the event time comes closer, and therefore sets the pathway in the case where the person moves to such direction, thereby carrying out the operation control to avoid the pathway.

The autonomous mobile device further includes the person identification unit for identifying the specified person, and the event information is the information in which the event site information and the specified person information are linked to each other. The virtual obstacle setting unit may set the virtual obstacle region in accordance with the event site information which is linked to the specified person information when the specified person information identified by the person identification unit and the specified person information held by the event information accords to each other. Accordingly, the autonomous mobile device can carry out the operation control to avoid a collision based on the event site relating to the specified person. For example, if the person is a specified resident of an apartment, the autonomous mobile device determines that the person will come home from the office or shopping almost at a scheduled time and move in a doorway direction with a high possibility, sets the pathways in the case where the person moves in such direction, and thus can carry out the operation control to avoid the pathways.

The collision avoidance device includes a position transportation unit which changes a position of the autonomous mobile device and the above described collision avoidance control unit, and controls the position transportation unit such that the autonomous mobile device takes at least one action of a stop, a deceleration, an acceleration, and a change of direction in order to avoid a collision with the moving object.

With such a configuration, the autonomous mobile device can carry out a proper avoidance operation considering a relation with the occupied region occupied by the moving object, thereby improving safeness.

Also, the autonomous mobile device may further include the alarm unit for informing the person as to the virtual obstacle region. According to such a configuration, the alarm unit can inform the person of the collision avoidance region the person should take, thereby being able to enhance the safeness to the person.

The alarm unit may indicate the virtual obstacle region, for example, on a floor in a manner the person can identify it. Accordingly, the person can visually know the safe sheltered region, which enhances the safeness to the person.

The program for the collision avoidance device is a program to be used in the collision avoidance device which avoids a collision with the moving object, and is characterized by having a computer execute the transfer information acquiring step for acquiring the transfer information representing the actual conditions of the movement of the moving object, the subsidiary information acquiring step for acquiring the subsidiary information representing the factors relating to the movement of the moving object, the virtual obstacle setting step for setting the virtual obstacle region based on the transfer information and the subsidiary information, and the obstacle avoidance control step for controlling the collision avoidance device so as to avoid a collision with the moving object based on the virtual obstacle region. In following the above steps, the collision avoidance device regards the moving object as an obstacle, determines that the moving object may go along a specific pathway with a high possibility from the subsidiary information, and thereby sets the virtual obstacle region also in such direction, resulting in expanding a predictable movement range. Accordingly, the virtual obstacle region is set so as to include the pathways where the moving object may go along with a high possibility, such that the program for the collision avoidance device can provide operation control to the collision avoidance device so as to avoid a collision even if the moving object changes his/her direction in a direction hardly linearly predictable.

Also, the collision avoidance device includes the basic module and the plug-in module. The basic module is a program relating to the transfer information acquiring step, the virtual obstacle setting step, and the obstacle avoidance step, whereas the plug-in module is a program relating to the subsidiary information acquiring step, and thus the plug-in module can be added to or replaced with the basic module.

With such a program, the plug-in module can be added to or replaced with the basic module. Therefore, a program relating to the subsidiary information acquiring step can be used by adding/replacing it with ease according to a usage thereof.

The plug-in module may be a program relating to at least one of the individual information, the map information, or the event information. Accordingly, the individual information, the map information, and the event information can be added or replaced to use them, such that a program for various collision avoidances device can be realized.

The plug-in module may be updatable from an external device. Accordingly, the individual information, the map information, and the event information can be readily added or updated from the external device, resulting in realizing a program for a collision avoidance device used for various purposes.

Summary of Embodiment

Now, a summary of the embodiment will be described below.

(1) As has been described above, the present embodiment is configured such that the first storage unit stores the information as to the temporary positional fluctuation of the person, and the virtual obstacle region setting unit sets the virtual obstacle region where it is predicted that the person travels following a predetermined time passage based on the information of the temporary positional fluctuation of the person. Therefore, the autonomous mobile device can take a safe, easy, and smooth evasive action with regard to the movement of a person owing to the above stated virtual obstacle region.

(2) It is prefarable that the region setting unit sets the region of the obstacle sensed by the first sensing unit as the actual obstacle region as well as combines the actual obstacle region with the virtual obstacle region to set a new obstacle region. With such a configuration, the autonomous mobile device can avoid a collision with the obstacle after the predetermined time passage while it avoids a collision with the obstacle at the current time.

(3) It is preferable for the control device to include the transfer pathway setting unit for setting the transfer pathway of the autonomous mobile device and the movement control unit for having the autonomous mobile device move along the transfer pathway set by the transfer pathway setting unit, in which the transfer pathway setting unit sets the transfer pathway of the autonomous mobile device so as to have the autonomous mobile device avoid the virtual obstacle region and the actual obstacle region when the virtual obstacle region and the actual obstacle region are set.

(4) It is preferable that the region setting unit sets the region where obstacle would travel following the predicted time passage as the virtual obstacle region by predicting the possible time at which the obstacle sensed by the first sensing unit and the autonomous mobile device may collide with each other. With such a configuration, the region setting unit predicts the possible time at which the obstacle and the autonomous mobile device may collide with each other and sets the virtual obstacle region based on thus predicted time, such that the autonomous mobile device can avoid a collision with ease.

(5) It is preferable that the autonomous mobile device includes the second sensing unit for sensing a position of the obstacle and the third sensing unit for sensing a speed of the obstacle, in which the control device predicts a possible time at which the obstacle and the autonomous mobile device may collide with each other, assuming that the obstacle moves with a uniform motion at the speed sensed by the third sensing unit from a position of the obstacle sensed by the second sensing unit and that the autonomous mobile device moves along the transfer pathway set by the transfer pathway setting unit.

(6) It is preferable that the autonomous mobile device includes the second sensing unit for sensing a position of the obstacle and the third sensing unit for sensing a speed of the obstacle, in which the control device calculates a distance Y between the obstacle and the autonomous mobile device in a direction parallel with the velocity vector of the obstacle, a distance $X1(T)$ of the obstacle after T time in the case where the obstacle moves at a speed sensed by the third sensing unit with the uniform linear motion, and a distance $X2(T)$ of the autonomous mobile device after T time in a velocity vector direction of the obstacle when the autonomous mobile device moves along the transfer pathway set by the transfer pathway setting unit, and predicts the possible time T at which the obstacle and the autonomous mobile device may get into collide with each other based on the following formula 1.

$$X1(T)-X2(T)=Y \qquad \text{[Formula 1]}$$

(7) It is preferable that the autonomous mobile device includes the second sensing unit for sensing a position of the obstacle, the third sensing unit for sensing a speed of the obstacle, and the fourth sensing unit for sensing an accelerated velocity of the obstacle, in which the control device calculates a distance Y between the obstacle and the autonomous mobile device in a direction parallel with the velocity vector of the obstacle, a distance $X1(T)$ of the obstacle after T time when the obstacle moves with a uniform accelerated linear motion at a speed sensed by the third sensing unit and at the accelerated velocity sensed by the fourth sensing unit, and a distance $X2(T)$ of the autonomous mobile device after the T time in a velocity vector direction of the obstacle when the autonomous mobile device moves along the transfer pathway set by the transfer pathway setting unit, and predicts the possible time T at which the obstacle and the autonomous mobile device may collide with each other based on the following formula 1.

$$X1(T)-X2(T)=Y \qquad \text{[Formula 1]}$$

(8) It is preferable that the autonomous mobile device includes the second sensing unit for sensing a position of the obstacle and the third sensing unit for sensing a speed of the obstacle, in which the control device calculates a position $Ph(t)$ of the obstacle after t time when the obstacle moves with the uniform linear motion at a speed sensed by the third sensing unit and a position $Pr(t)$ of the autonomous mobile device after t time when the autonomous mobile device moves along the transfer pathway set by the transfer pathway setting unit, and predicts the time T in which the distance between the obstacle and the autonomous mobile device become minimum as a possible time at which the obstacle and the autonomous mobile device may collide with each other. With such a configuration, since the collision prediction time is calculated even if the distance between the obstacle and the autonomous mobile device does not become less than zero, the collision with the obstacle can be securely avoided.

$$T = \arg\min_{t} |Ph(t) - Pr(t)|,$$ [Formula 3]

PROVIDED THAT, IF THERE ARE PLURALITY OF (t)S, THE MINIMUM VALUE WILL BE EMPLOYED (9) It is preferable that the control device includes the first setting unit for setting a variance of the accelerated velocity of the obstacle, in which the region setting unit sets the virtual obstacle region based on the possible time at which it is predicted that the obstacle and the autonomous mobile device may collide each other and the variance of the accelerated velocity of the obstacle set by the first setting unit. With such a configuration, the virtual obstacle region can be set to a proper range when the accelerated velocity of the obstacle can be preliminary presumed.

(10) It is preferable that the autonomous mobile device stores a relation between the lapsed time and a degree of the positional fluctuation of the obstacle with regard to a direction of the velocity vector of the obstacle and a direction orthogonal to the velocity vector, and the virtual obstacle region is set based on the relation between the lapsed time and thus stored degree of positional fluctuation of the obstacle. With such a configuration, the virtual obstacle region can be set to a proper range when a range where the obstacle moves following the time passage can be preliminary predicted.

(11) It is preferable that the control device includes the first determination unit for determining whether or not the obstacle sensed by the first sensing unit is a person and the fifth sensing unit for sensing a face orientation or a direction of eyes of the person, in which the virtual obstacle region is expanded in accordance with the angle created between the face orientation or the direction of eyes sensed by the fifth sensing unit and the straight lines coupling the autonomous mobile device with the person when the first determination unit determines that the obstacle is a person. The above configuration enables the autonomous mobile device to take a suitable procedure when the person hardly awakes the autonomous mobile device. In the present embodiment, the virtual obstacle region may be expanded uniformly in every direction, or the virtual obstacle region may be expanded in the direction of the face orientation or the direction of eyes of the person. When the virtual obstacle region is expanded uniformly in every direction, a suitable procedure can be taken when it is difficult to awake the autonomous mobile device even without the necessity of sensing the face orientation or the direction of eyes. On the other hand, when the virtual obstacle region is expanded in the direction of the face orientation or the direction of eyes of the person, the virtual obstacle region can be suitably expand to a region the person tends to travel.

(12) It is preferable that the control device includes the first determination unit for determining whether or not the obstacle sensed by the first sensing unit is a person and the fifth sensing unit for sensing a face orientation and a direction of eyes of the person, in which the virtual obstacle region is shifted to the direction of the face orientation or the direction of eyes of the person in accordance with an angle created between the face orientation or the direction of eyes of the person sensed by the fifth sensing unit and the straight lines coupling the autonomous mobile device with the person when the first determination unit determines that the obstacle is a person. The above configuration enables the autonomous mobile device to take a suitable procedure when the person hardly awakes the autonomous mobile device.

(13) It is preferable that the control device includes the first determination unit for determining whether or not the obstacle sensed by the first sensing unit is a person and the sixth sensing unit for sensing a height of the person, in which the virtual obstacle region is expanded if the height of the person sensed by the sixth sensing unit is lower than a predetermined height.

(14) It is preferable that the control device includes the first determination unit for determining whether or not the obstacle sensed by the first sensing unit is a person, the map information storage unit for storing the map information as to a movement region of the autonomous mobile device, and the moving tendency storage unit which stores a relation between a time and the person in association with the map information stored in the map information storage unit, in which the virtual obstacle region is corrected based on the moving tendency of the person corresponding to the time stored in the moving tendency storage unit. With such a configuration, the virtual obstacle region can be set to a proper range when the moving direction of the person tends to correspond to the time.

(15) It is preferable that the control device includes the first determination unit for determining whether or not the obstacle sensed by the first sensing unit is a person, the first specifying unit for specifying the person, and the ID information storage unit for storing ID information containing the information as to the moving tendency of the person specified by the first specifying unit, in which the virtual obstacle region is corrected based on the information as to the moving tendency of the person stored in the ID information storage unit when the first determination unit determines that the obstacle is a person and the first specifying unit specifies the person. With such a configuration, since the virtual obstacle region is corrected according to the moving tendency of the person stored in the ID information storage unit, the autonomous mobile device can avoid a collision with a person easier in comparison with a case that the virtual obstacle region is set considering only a general positional fluctuation.

(16) It is preferable that the control device includes the first determination unit for determining whether or not the obstacle sensed by the first sensing unit is a person and the map information storage unit for storing the map information as to the movement region of the autonomous mobile device, in which the ID information storage unit stores a relation between the time and the moving tendency of the person in association with the map information stored in the map information storage unit with regard to the person specified by the first specifying unit and the virtual obstacle region is corrected based on the moving tendency of the person corresponding to the time stored in the ID information storage unit. With such a configuration, since the virtual obstacle region is corrected according to the moving tendency of the person corresponding to the time, the autonomous mobile device can avoid a collision with the person easier in comparison with a case that the virtual obstacle region is set considering only a general positional fluctuation.

(17) It is preferable that the map information includes nodes which are positioned discretely within the movement region of the autonomous mobile device, and the moving tendency storage unit stores a relation between the time and the moving tendency of the person in association with each of the nodes. Such a configuration enables the autonomous mobile device to avoid a collision with the person easier.

(18) It is preferable that the region setting unit is added or updated by an additional program.

(19) It is preferable that the control device includes the transfer pathway setting unit for setting the transfer pathway of the autonomous mobile device and the movement control unit for having the autonomous mobile device move along the transfer pathway set by the transfer pathway setting unit, in which the control device can optionally include the virtual obstacle region setting unit for setting the virtual obstacle region in which it is predicted that the sensed obstacle moves following a predetermined time passage based on the information as to the preliminary stored temporary positional fluctuation of the obstacle, and the transfer pathway setting unit sets the transfer pathway so as to avoid the virtual obstacle region set by the virtual obstacle region setting unit if the virtual obstacle region setting unit is added to the control unit.

(20) It is preferable that the virtual obstacle region setting unit is added or updated by the additional program.

(21) It is preferable that the control device includes a potential transfer pathway generation unit for generating a plurality of potential pathways, based on the map information, in which it is predicted that the obstacle may travel, and the region setting unit sets the virtual obstacle region to every potential pathway of the pathways in which it is predicted that the obstacle travels. With such a configuration, the plurality of transfer pathways of the obstacle are predicted based on the map information to generate the potential pathways, thereby setting the virtual obstacle region for every potential pathway, such that the virtual obstacle region can be set to a region where the obstacle travels at a high possibility even in such a case that the transfer pathway where the obstacle travels is unknown. Therefore, the collision with the obstacle can be avoided easier even when the information of a fork road is contained in the map information contains.

(22) It is preferable that the region setting unit calculates the virtual obstacle region at a predicted collision time provided that the autonomous mobile device is taking the uniform motion as well as calculates the virtual obstacle region at a predicted collision time provided that the autonomous mobile device is taking the uniform accelerated motion, and thereby sets a new virtual obstacle region encompasses thus calculated virtual obstacle regions. With such a configuration, since a new virtual obstacle region encompasses the virtual obstacle region assuming that the autonomous mobile device moves with the uniform motion and the virtual obstacle region assuming that the autonomous mobile device moves with the uniform accelerated motion, setting of the transfer pathway between those virtual obstacle regions can be avoided even when two virtual obstacle regions which are spaced from each other are calculated.

(23) The autonomous mobile device including the first sensing unit for sensing the obstacle and the control device for the use in the autonomous mobile device.

(24) The program for the use in the autonomous mobile device of which movement is controlled by the control device having the control device execute the first function for setting the virtual obstacle region in which it is predicted that the sensed obstacle travels following a predetermined time passage based on the information as to the temporary positional fluctuation of the obstacle preliminary stored in the control device.

(25) The program in the use for the autonomous mobile device of which movement is controlled by the control device including a basic program having the control device execute the pathway setting function for setting the transfer pathway of the autonomous mobile device and a movement control function for controlling the autonomous mobile device so as to have the autonomous mobile device to move along the transfer pathway set by the pathway setting function; in which the basic program can optionally include a sub program having a function to set the virtual obstacle region in which it is predicted that the sensed obstacle travels following a predetermined time passage, and can have the control device execute the pathway setting function for setting the transfer pathway so as to have the autonomous mobile device avoid the virtual obstacle region set by the sub program when the sub program is added to the basic program.

(26) It is preferable that the sub program has the control device execute the pathway setting function based on the information as to the temporary positional fluctuation of the obstacle preliminary stored in the control device.

INDUSTRIAL APPLICABILITY

As described above, the present invention is configured to avoid a collision with a moving object by predicting a residence region of the moving object using subsidiary information representing factors associated with the transfer information and movement representing actual conditions of the movement of the moving object which is not linearly predictable, and thus is advantageous for the use in an autonomous mobile device, a control device for the autonomous mobile device, a program for the autonomous mobile device, a robot device, a vehicle device, an electric wheel chair, and the like.

This application is based on Japanese Patent Application No. and 2007-266340 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A control device capable of controlling a movement of an autonomous mobile device with a first sensing unit for sensing an obstacle, comprising:

a first storage unit for storing information as to a temporary positional fluctuation of the obstacle;

a region setting unit for setting a region in which it is predicted that the obstacle sensed by the first sensing unit will travel following a predetermined passage of time as a virtual obstacle region based on information as to the temporary positional fluctuation of the obstacle stored in the first storage unit;

a second sensing unit for sensing a position of the obstacle; and a third sensing unit for sensing a speed of the obstacle, wherein the region setting unit sets the region of the obstacle sensed by the first sensing unit as an actual obstacle region and combines the actual obstacle region with the virtual obstacle region to set a new obstacle region, a time at which the obstacle sensed by the first sensing unit and the autonomous mobile device may collide with each other is predicted, the region setting unit sets the region in which it is predicted that the obstacle will travel following the predicted time passage as the virtual obstacle region, and wherein the control device calculates a position Ph(t) of the obstacle after t time when the obstacle moves with a uniform linear motion at a speed sensed by the third sensing unit and a position Pr(t) of the autonomous mobile device after t time when the autonomous mobile device moves along the transfer pathway set by the transfer pathway setting unit, and predicts the time T at which a distance between the obstacle and the autonomous mobile device becomes a minimum value as a possible time at which the obstacle and the autonomous mobile device may collide with each other based on the following formula 3, $$T = \arg \min_t |Ph(t) - Pr(t)|, \quad \text{[Formula 3]}$$

PROVIDED THAT, IF THERE ARE PLURALITY OF (t)S, THE MINIMUM VALUE WILL BE EMPLOYED.

2. An autonomous mobile device, comprising:
a sensing unit for sensing an obstacle; and
a control device for the autonomous mobile device according to claim 1.

3. A control device capable of controlling a movement of an autonomous mobile device with a first sensing unit for sensing an obstacle, comprising:
a first storage unit for storing information as to a temporary positional fluctuation of the obstacle;
a region setting unit for setting a region in which it is predicted that the obstacle sensed by the first sensing unit will travel following a predetermined passage of time as a virtual obstacle region based on information as to the temporary positional fluctuation of the obstacle stored in the first storage unit;
a first determination unit for determining whether or not the obstacle sensed by the first sensing unit is a person;
a map information storage unit for storing map information as to a movement region of the autonomous mobile device; and
a moving tendency storage unit for storing a relationship between a time and a moving tendency of the person in association with the map information stored in the map information storage unit,
wherein the virtual obstacle region is corrected based on the moving tendency of the person corresponding to the time stored in the moving tendency storage unit,
the map information includes nodes of which positions are discretely set within the movement region of the autonomous mobile device, and
the moving tendency storage unit stores a relationship between the time and the moving tendency of the person in association with each of the nodes.

4. An autonomous mobile device, comprising:
a sensing unit for sensing an obstacle; and
a control device for the autonomous mobile device according to claim 3.

* * * * *